US012717560B2

(12) United States Patent
Palukuri et al.

(10) Patent No.: US 12,717,560 B2
(45) Date of Patent: Aug. 25, 2026

(54) FIELD EXTRACTION OF HETEROGENEOUS LOG RECORDS WITH RECURSIVE SUB PARSING AT INGEST TIME

(71) Applicant: Oracle International Corporation, Redwood Shores, CA (US)

(72) Inventors: Kiran Palukuri, Karnataka (IN); Pankaj Agrawal, Telangana (IN); Santhosh Kumar Vuda, Karnataka (IN); Jerry Russell, Seattle, WA (US)

(73) Assignee: Oracle International Corporation, Redwood Shores (CA)

( * ) Notice: Subject to any disclaimer, the term of this patent is extended or adjusted under 35 U.S.C. 154(b) by 81 days.

(21) Appl. No.: 18/474,947

(22) Filed: Sep. 26, 2023

(65) Prior Publication Data

US 2025/0103307 A1 Mar. 27, 2025

(51) Int. Cl.
*G06F 8/41* (2018.01)

(52) U.S. Cl.
CPC .................................... *G06F 8/427* (2013.01)

(58) Field of Classification Search
CPC ........ G06F 8/427; G06F 40/20; G06F 40/205; G06F 40/211
See application file for complete search history.

(56) References Cited

U.S. PATENT DOCUMENTS

| | | | | |
|---|---|---|---|---|
| 11,625,366 B1 * | 4/2023 | Steiman | G06N 5/022 | 707/601 |
| 11,755,430 B2 * | 9/2023 | Jha | G06F 16/2477 | 707/736 |
| 2008/0243715 A1 * | 10/2008 | Stellhorn | G06Q 40/12 | 705/30 |
| 2010/0306285 A1 * | 12/2010 | Shah | G06F 40/211 | 707/E17.005 |
| 2016/0292263 A1 * | 10/2016 | Ferrar | G06F 11/3006 | |
| 2021/0034497 A1 * | 2/2021 | Peterson | G06F 11/324 | |

* cited by examiner

*Primary Examiner* — Duy Khuong T Nguyen
(74) *Attorney, Agent, or Firm* — Mughal Gaudry & Franklin PC

(57) ABSTRACT

A system and computer-implemented method for a log analytics system that can configure, collect, parse, and analyze log records in an efficient manner. Log records are accessed, each of the log records is associated with a log source. A base parser is identified for parsing a log record based on a type of the log record indicated in the log source. The log record is parsed using the base parser to extract base field values corresponding to base fields. A base-parsed log record is generated on parsing. Sub-parsers are identified using field mappings. The field mappings include base field values mapped to corresponding sub-parsers. The base-parsed log record is parsed using the sub-parsers to extract sub-fields. The sub-fields are merged to the base fields to generate and present an output that includes the parsed log record, the base fields, base field values, the sub-fields and the sub-field values.

20 Claims, 24 Drawing Sheets

320

Original Log (rsyslog)

322

[origin software="rsyslogd" swVersion="8.24.0-57.0.1.el7_9"

xpid="2136" x-info="http://www.rsyslog.com"] rsyslogd was UPed

Wrapped Log (rsyslog)

324

May 28 03:28:02 oke-hostname rsyslogd: [origin software="rsyslogd" swVersion="8.24.0-57.0.1.

el7_9" xpid="2136" x-info="http://www.rsyslog.com"] rsyslogd was HUPed

Original Log (crio)

332 time="2023-05-28 03:28:

13.167599981Z" level=info msg="Checking image status: wordpress:4.8- apache" id=c4fdeae3-ae30-409ba2c6-1c99a063c257 name=/runtime.v1.ImageService/ImageStatus

Wrapped Log (crio)

334

May 28 03:28:13 oke-hostname crio:

time="2023-05-28 03:28:13.167599981

Z" level=info msg="Checking image status: wordpress:4.8-
apache"

id=c4fdeae3-ae30-409ba2c6-1c99a063c257 name=/
runtime.v1.

ImageService/ImageStatus

Original Log (kubelet)

342

E0528 03:29:04.168420 15572 pod_workers.go:919]

"Error syncing pod, skipping" err="failed to \"StartContainer\"

for \"pi\" with ImagePullBackOff: \"Back-off pulling image\\\

"perl\\\"\""pod="default/pishf65"podUID=9ba735bb-fb98-4f2c-8354-402de3d2ca76

Wrapped Log (kubelet)

344

May 28 03:29:04 oke-hostname kubelet: E0528 03:29:04.168420

15572 pod_workers.go:919] "Error syncing pod, skipping" err="failed to \"StartContainer\" for \"pi\" with ImagePullBackOff: \"Back-off pulling image \\\"perl\\\"\"" pod="default/pishf65"

podUID=9ba735bbfb98-4f2c-8354-402de3d2ca76

Original Log (kube-proxy logs)

402

2023-06-20 01:54:49 +0000 [info]: #0

Timeout flush: oci.oke.kube-proxy.var.

log.containers.kube-proxy-8l5j7_kubesystem_kube-proxy-

8a02ecacb4568b00a95d0ea2a12ef378a87b327caa250ded980b3a e88b1a0e7f.log:

Wrapped Log (kube-proxy logs)

404

2023-06-20T01:54:49.437685797Z stdout F 2023-06-20 01:54:49

+0000 [info]: #0 Timeout flush: oci.oke.kube-proxy.var.log.containers.kube-proxy-8l5j7_kube-system_kubeproxy- 8a02ecacb4568b00a95d0ea2a12ef378a87b327caa250ded98

0b3ae88b1a0e7f.log:

Original Log (CSI Node Driver log)

412

2021-06-08T13:56:53.407Z

INFO driver/driver.go:68 Creating a new CSI Node driver.

{"endpoint": "unix:///csi/csi.sock", "kubeconfig": ",

"master": ", "nodeID": "192.168.0.11"}

Wrapped Log (CSI Node Driver log)

414

2023-05-26T14:53:16.961405582+00:00 stdout F 2021-06-

08T13:56:53.407Z

INFO driver/driver.go:68 Creating a new CSI Node driver.

{"endpoint": "unix:///csi/csi.sock", "kubeconfig": ", "master": ","nodeID":

500 IDCS Log

502
[2023-03-14T08:07:21.541+00:00] [oic_server1] [NOTIFICATION] []
[oracle.ics.trace.soa.bpel] [host: a31034c3-7d0a-415f-904a-1a7170c7dae9-
ms1.dpapp.oic.oraclevcn.com] [nwaddr: 10.13.66.21] [tid: 91] [userId: gbintoic_
wms] [ecid: 7db4e750-68ac-4775-a45d-407b51250710-00200069,1:169876] [APP: soa-
infra] [partition-name:DOMAIN] [tenant-name: GLOBAL] [FlowId:
0000ORVA7nSDwWdLxeO5yW1^1i3l000T9Y] [oci.instanceName:GBOICGLR1PR]
[oci.identityDomain: identityDomainName] [ICS Tracing Enabled]:
[Code:OUT_WMS_TO_OTM_ACTUA_SHIPM][Version:01.00.0000][Instance:428513626][L
ocation:Loop Processing Begins][Operation:For
Each][ActionID:f10][ActionName:Each_Shipment_ReleaseLinePrincipal][ActionType:For
Each][PayloadSizeInBytes:965][Pltr:f9#6][Cltr:f10#17]:<ReleaseLine xmlns="http://
xmlns.oracle.com/cloud/adapter/nxsd/surrogate/Read_ShipmentReleasePrincipal">[[

504
<ReleaseLineGid>
<Gid>
<DomainName>LAC</DomainName>
<Xid>1693035-ERP_HGB-0019</Xid>
</Gid>
</ReleaseLineGid>
<Refnum>
<RefnumQualifierGid>
<Gid>
<DomainName>LAC</DomainName>
<Xid>ORDER_LINE_ID</Xid>
</Gid>
</RefnumQualifierGid>
<RefnumValue>300006509929309</RefnumValue>
</Refnum>
<Refnum>
<RefnumQualifierGid>
<Gid>
<DomainName>LAC</DomainName>
<Xid>SOURCE_SYSTEM_DOC_LINE_ID</Xid>
</Gid>
</RefnumQualifierGid>
<RefnumValue>61</RefnumValue>
</Refnum>
</ReleaseLine>
]]

502
[2023-03-14T08:07:21.545+00:00] [oic_server1] [NOTIFICATION] []
[oracle.ics.trace.soa.bpel] [host: a31034c3-7d0a-415f-904a-1a7170c7dae9-
ms1.dpapp.oic.oraclevcn.com] [nwaddr: 10.13.66.21] [tid: 91] [userId: gbintoic_wms] [ecid:
7db4e750-68ac-4775-a45d-407b51250710-00200069,1:169876] [APP: soa-infra] [partition-
name: DOMAIN] [tenant-name: GLOBAL] [FlowId:
0000ORVA7nSDwWdLxeO5yW1^1i3l000T9Y] [oci.instanceName: GBOICGLR1PR]
[oci.identityDomain: identityDomainName] [ICS Activity Stream Logging]:
[Code:OUT_WMS_TO_OTM_ACTUA_SHIPM]
[Version:01.00.0000][Instance:428513626][Operation:For
Each][ActionID:f11][ActionName:Each_ShipmentReleaseLineRefnum][ActionType:For
Each][Pltr:f10#17][Cltr:f11#1]: Loop Processing Begins

Original Log (Pre normalization)

602

```
####<Feb 01, 2021 10:28:27 AM PST> <Info> <Diagnostics> <soaappstg-
aaa.domain.com> <excstg_aaa> <[ACTIVE]
ExecuteThread: '34' for queue: 'weblogic.kernel.Default (self-tuning)'> <<WLS
Kernel>> <> <6f8e36fc-645a-4b5b-
99e5-b30f7b08da6b-00000a44> <1500084027625> <[severity-value: 64] [rid: 0]
[partition-id: 0] [partition-name:
DOMAIN] > <BEA-320145> <Size based data retirement operation completed on
archive HarvestedDataArchive.
Retired 9,720 records in 11,242 ms.>
```

Normalized WLS server log (Post normalization)

604

```
{
   "data": {
      "Labels": "LogPath:/u01/APPLTOP/instance/wlslogs/FADomain/
servers/ServiceServer_1/logs/ServiceServer_1.log;
ServiceName:Host;ServiceType:Oracle_Host;LogSet:TEST_POD;HostName:
cffar31070v05.usdc2.oraclecloud.com;IP:
10.35.29.45;WLS:NA;Domain:NA;AppName:GSI;Customer:Fake Company,
(U.S.) Corp;CustomerType:NonHypercare;PODType:
TEST;PODSize:S0;DC:CDC;Version:11.13.20.10.0;",
      "action": "ACTION",
      "msg": "####<Feb 01, 2021 10:28:27 AM PST> <Info> <Diagnostics>
<soaappstg-aaa.domain.com> <excstg_aaa> <
[ACTIVE] ExecuteThread: '34' for queue: 'weblogic.kernel.Default (self-
tuning)'> <<WLS Kernel>> <> <6f8e36fc-
645a-4b5b-99e5-b30f7b08da6b-00000a44> <1500084027625> <[severity-
value: 64] [rid: 0] [partition-id: 0]
[partition-name: DOMAIN] > <BEA-320145> <Size based data retirement
operation completed on archive
HarvestedDataArchive. Retired 9,720 records in 11,242 ms.>"
   },
      "id": "123123123",
      "oracle": {
      "compartmentid": "ocid1.compartment.oc1..uniqueID",
      "ingestedtime": "2021-02-01T18:32:49.204Z",
       "loggroupid": "ocid1.loggroup.oc1.iad.uniqueID",
       "logid": "ocid1.log.oc1.iad.uniqueID",
       "tenantid": "ocid1.tenancy.oc1..uniqueID"
   },
       "source": "FA-APPS",
       "specversion": "1.0",
       "time": "2021-02-01T11:48:43.091Z",
       "type": "FA Unified Apps Logs"
}
```

FIG. 6

Advanced use cases

720

```
2023-06-06T10:39:56.435598062Z stdout F 2023-06-06 10:39:56 +0000 [warn]: parameter 'enable_ruby' in <match
oci.**>
2023-06-06T10:39:56.435619101Z stdout F @type oci-logging-analytics
2023-06-06T10:39:56.435622795Z stdout F enable_ruby true
2023-06-06T10:39:56.435626096Z stdout F namespace <namespace>
2023-06-06T10:39:56.435628991Z stdout F endpoint ""
2023-06-06T10:39:56.435632353Z stdout F config_file_location "/var/opt/.oci/config"
2023-06-06T10:39:56.435635332Z stdout F profile_name "DEFAULT"
2023-06-06T10:39:56.435638661Z stdout F plugin_log_location "/var/log"
2023-06-06T10:39:56.43564148Z stdout F plugin_log_level "info"
2023-06-06T10:39:56.435644715Z stdout F plugin_log_file_size "10MB"
2023-06-06T10:39:56.435647448Z stdout F plugin_log_file_count 10
2023-06-06T10:39:56.43565115Z stdout F kubernetes_metadata_keys_mapping {"container_name":"Container","
namespace_name":"Namespace","pod_name":"Pod","container_image":"Container Image Name","host":"Node"}
2023-06-06T10:39:56.435653899Z stdout F <buffer>
2023-06-06T10:39:56.435679123Z stdout F @type "file"
2023-06-06T10:39:56.43568312Z stdout F path "/var/log/oci_la_fluentd_outplugin/logs/buffer/"
2023-06-06T10:39:56.435685908Z stdout F flush_thread_count 1
2023-06-06T10:39:56.435688656Z stdout F chunk_limit_size 2m
2023-06-06T10:39:56.435691274Z stdout F total_limit_size 5368709120
2023-06-06T10:39:56.435694119Z stdout F flush_interval 30
2023-06-06T10:39:56.435697028Z stdout F flush_thread_interval 0.5
2023-06-06T10:39:56.435699844Z stdout F flush_thread_burst_interval 0.05
2023-06-06T10:39:56.435702141Z stdout F retry_wait 2
2023-06-06T10:39:56.43570498Z stdout F retry_max_times 17
2023-06-06T10:39:56.435707578Z stdout F retry_exponential_backoff_base 2
2023-06-06T10:39:56.435710511Z stdout F retry_forever true
2023-06-06T10:39:56.435713284Z stdout F disable_chunk_backup true
2023-06-06T10:39:56.435715895Z stdout F </buffer>
2023-06-06T10:39:56.435718735Z stdout F </match> is not used.
```

```
2023-06-06 10:39:56 +0000 [warn]: parameter 'enable_ruby' in <match oci.**>
    @type oci-logging-analytics
    enable_ruby true
    namespace <namespace>
    endpoint ""
    config_file_location "/var/opt/.oci/config"
    profile_name "DEFAULT"
    plugin_log_location "/var/log"
    plugin_log_level "info"
    plugin_log_file_size "10MB"
    plugin_log_file_count 10
    kubernetes_metadata_keys_mapping
{"container_name":"Container","namespace_name":"Namespace","pod_name":"
Pod","container_image":"Container Image Name","host":"Node"}
    <buffer>
        @type "file"
        path "/var/log/oci_la_fluentd_outplugin/logs/buffer/"
        flush_thread_count 1
        chunk_limit_size 2m
        total_limit_size 5368709120
        flush_interval 30
        flush_thread_interval 0.5
        flush_thread_burst_interval 0.05
        retry_wait 2
        retry_max_times 17
        retry_exponential_backoff_base 2
        retry_forever true
        disable_chunk_backup true
    </buffer>
</match> is not used.
```

FIG. 7D

FIELD EXTRACTION OF HETEROGENEOUS LOG RECORDS WITH RECURSIVE SUB PARSING AT INGEST TIME

FIELD

The present disclosure generally relates to log record parsing, specifically configuration of multiple parsers for sub parsing log records at ingestion time.

BACKGROUND

Many types of computing systems and applications generate vast amounts of data pertaining to or resulting from the operation of that computing system or application. These vast amounts of data are often stored in collected locations, such as log files, which can then be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant issue pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may run on and across multiple computing systems, making the task of coordinating log configuration and collection even more problematic.

Conventional log analytics tools provide rudimentary abilities to collect and analyze log records. However, conventional systems cannot efficiently scale when posed with the problem of massive systems involving large numbers of computing systems having large numbers of applications running on those systems. This is because conventional systems often work on a per-host basis, where set-up and configuration activities need to be performed each and every time a new host is added or newly configured in the system, or even where new log collection/configuration activities need to be performed for existing hosts. This approach is highly inefficient given the extensive number of hosts that exist in modern systems. Furthermore, the conventional approaches, particularly on-premise solutions, also fail to adequately permit sharing of resources and analysis components. This causes significant and excessive amounts of redundant processing and resource usage.

Structured log files can be an organized list of data entries in a well-structured and consistent format that can be easily read, searched, and analyzed by one or more applications of interest. Exemplary standard formats for structured log file can include JavaScript Object Notation (JSON) or Extensible Markup Language (XML).

However, frequently, logs from different sources and applications are available in the form of wrapped logs. For example, a plain text log may get wrapped into a JSON format by a Kubernetes containers' logging driver. A plain text log could be parsed using a regular expression-based log parser. However, when it's wrapped in a JSON format, a JSON-based parsing mechanism would be required to unwrap the plain text log from the JSON format. Using the JSON-based parsing mechanism still results in the original plain text log being received as a JSON attribute's value, which cannot then be parsed any further as its JSON escaped.

Further, logs emitted by an application may be unavailable directly but instead available through another log analysis tool. The analysis tool typically adds its own wrapper on top of the original log. A payload is wrapped into another kind or envelope. Formats of an outer envelope that wraps the original log (referred to as inner payload) and the inner payload could be varied in nature. For example, a JSON wrapper over a plain text log or a plain text wrapper over XML log. There could be numerous such combinations based on the applications from which the logs originate and the manner in which they are acquired and enriched. The outer envelope and the inner payload and their values could be in different formats like plain text, JSON, XML, delimited etc.

Moreover, the parsing of the wrapped log records is complex and time consuming. This can result in extra usage of computational resources and long latencies in delivering or availing processing results. Thus, there is a need for a technique that can efficiently and accurately parse wrapped log records. Further, there is a need to avail the unwrapped log records in a manner that is meaningful and interpretable. A well-defined support for varied combinations (homogenous as well as heterogenous) for the outer envelope format and the inner payload is also needed.

BRIEF SUMMARY

In an embodiment, a computer-implemented method includes accessing a plurality of log records. Each of the plurality of log records is associated with a log source. The method includes identifying a base parser of a plurality of base parsers for parsing a log record of the plurality of log records based on a type of the log record. The type of the log record is indicated in the log source. The method includes parsing the log record using the base parser to extract base field values corresponding to a plurality of base fields of the log record. A base-parsed log record is generated on parsing the log record using the base parser. The method includes identifying a plurality of sub-parsers using field mappings. The field mappings associate each of one or more base field values with a corresponding sub-parser, and the field mappings are configured in the plurality of base parsers. The method includes parsing the base-parsed log record using the plurality of sub-parsers to extract sub-fields. Each sub-field has a corresponding sub-field value. The method includes merging the sub-fields with the plurality of base fields to generate an output. The method includes the output that includes the log record with the plurality of base fields and corresponding base field values and the sub-fields with the corresponding sub-field values.

In another embodiment, a system comprising one or more processors, and a memory coupled to the one or more processors, the memory storing a plurality of instructions executable by the one or more processors, the plurality of instructions that when executed by the one or more processors cause the one or more processors to perform a set of operations. A plurality of log records is accessed. Each of the plurality of log records is associated with a log source. A base parser of a plurality of base parsers is identified for parsing a log record of the plurality of log records based on a type of the log record. The type of the log record is indicated in the log source. The log record is parsed using the base parser to extract base field values corresponding to a plurality of base fields of the log record. A base-parsed log record is generated on parsing the log record using the base parser. A plurality of sub-parsers is identified using field mappings. The field mappings associate each of one or more base field values with a corresponding sub-parser, and the field mappings are configured in the plurality of base parsers. The base-parsed log record is parsed using the plurality of sub-parsers to extract sub-fields. Each sub-field has a corresponding sub-field value. The sub-fields are merged with the plurality of base fields to generate an output. The output is presented that includes the log record with the plurality of base fields and corresponding base field values and the sub-fields with the corresponding sub-field values.

In yet another embodiment, a non-transitory computer-readable medium storing a plurality of instructions executable by one or more processors that cause the one or more processors to perform operations. In one step, a plurality of log records is accessed. Each of the plurality of log records is associated with a log source. A base parser of plurality of base parsers are identified for parsing a log record of the plurality of log records based on a type of the log record. The type of the log record is indicated in the log source. The log record is parsed using the base parser to extract base field values corresponding to a plurality of base fields of the log record. A base-parsed log record is generated on parsing the log record using the base parser. A plurality of sub-parsers are identified using field mappings. The field mappings include one or more base field values mapped to a corresponding sub-parser, and the field mappings are configured in the plurality of base parsers. The base-parsed log record are parsed using the plurality of sub-parsers to extract sub-fields. Each sub-field has a corresponding sub-field value. The sub-fields are merged to the plurality of base fields to generate an output. The output is presented that includes the log record with the plurality of base fields with corresponding base field values and the sub-fields with corresponding sub-field values.

In various aspects, a system is provided that includes one or more data processors and a non-transitory computer readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIGS. 3A-3D are exemplary extracted data log illustrating an array of JSON, syslog, crio, and kubelet log records, respectively.

FIG. 4A is an exemplary extracted data log illustrating an array of Kubernetes log records.

FIG. 4B is an exemplary extracted data log illustrating a CRI-O container runtime in Kubernetes.

FIG. 5 illustrates an exemplary extracted data log illustrating an array of non-kubernetes log records, including Oracle Identity Cloud Service (IDCS) log.

FIG. 6 illustrates an exemplary extracted data log illustrating a pre-wrapped and post-wrapped Weblogic Server logs.

FIG. 7C illustrates a graphical representation of a Kubernetes container log snippet.

FIG. 7D illustrates a graphical representation of a processed log record.

DETAILED DESCRIPTION

Figure 1:
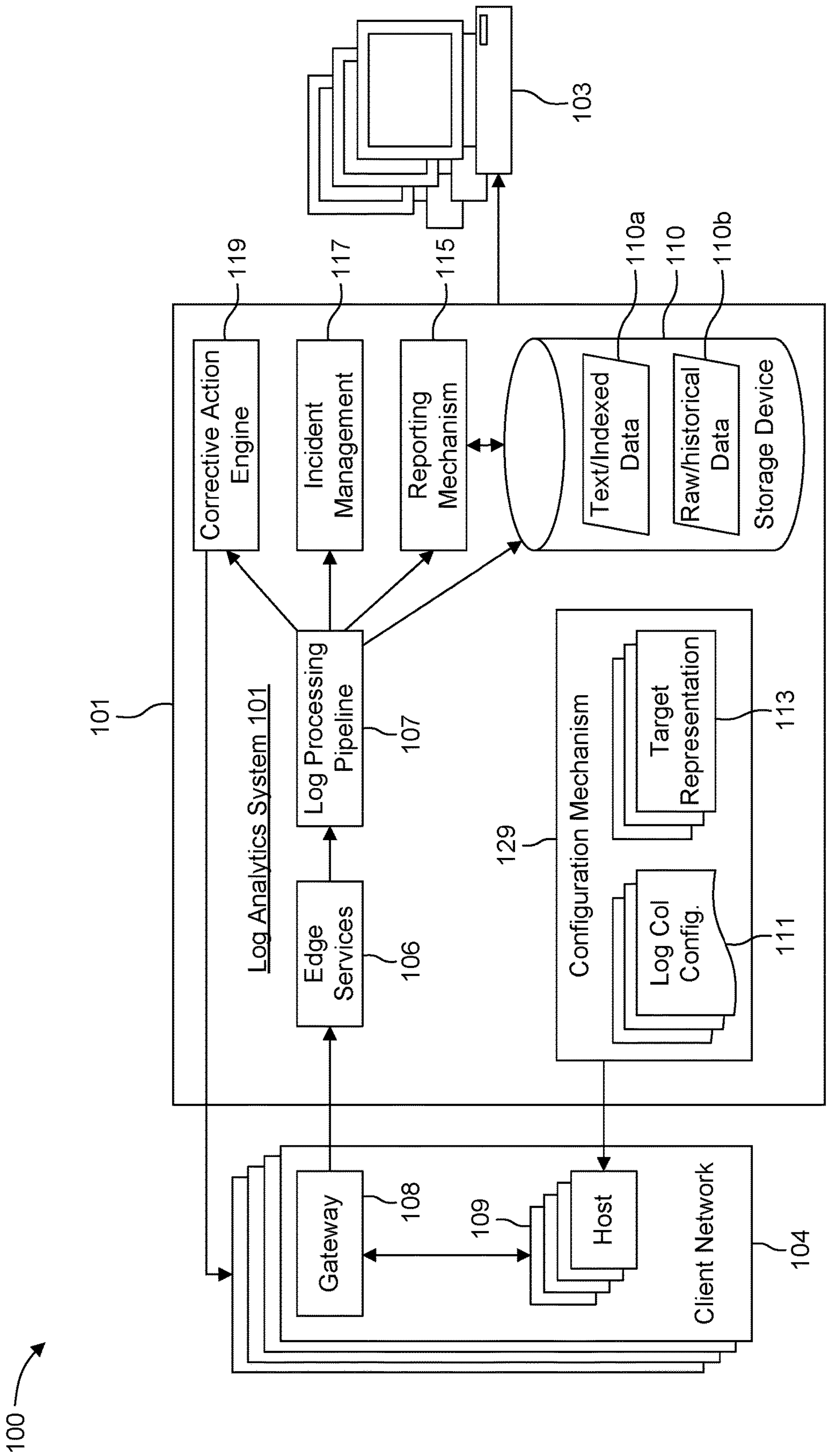
FIG. 1 illustrates an example system which may be employed in some embodiments of the invention.

The present invention provides a system and computer-implemented method for a log analytics system that can configure, collect, parse, and analyze log records in an efficient manner. Initially, log records are accessed, each of the log records is associated with a log source. Base parsers are identified for parsing a log record based on a type of the log record indicated in the log source. The log source includes log generated by various client networks. The log record is parsed using the base parsers to extract base field values corresponding to base fields. Few of the log records are wrapped with an outer envelope. In these log records the message field is the actual application log which can be in regex, JSON, XML, Delimited, plain text etc. formats. The message to be extracted by the log parsers is wrapped in the log record as an outer envelope and an inner payload which can be regex, JSON, XML, plain text etc. The outer or base parser type (regex, JSON, XML etc.) depends on the format of the outer envelope. The base parsers are used to parse the outer envelope. Each base field extracted by the base parsers have a corresponding base field value. For example, JSON paths are mapped to fields. Field-$.data.msg is mapped to Message field. At the time of data ingestion, the value corresponding to $.data.msg is extracted and indexed with the name Message.

A base-parsed log record is generated on parsing the log record using the base parsers. The base-parsed log record is used to identify one or more sub-parsers. The sub-parsers are identified using field mappings which include base field values mapped to corresponding sub-parsers. The field mapping may be identified via user input received in a graphical user interface or through REST API.

The field mappings are configured in the base parsers. The sub-parsers are used to parse the inner payload that includes the message. The inner or sub-parser parser type (regex, JSON, XML etc.) depends on the format of the inner payload. For example, for the field value $.data.msg, the $.data.msg is mapped to a sub-parser with the name "Sub-Parser Test".

The base-parsed log record is further parsed using the sub-parsers to extract sub-fields. The sub-fields include the message to be extracted and the sub-field value includes the message content. The sub-fields are merged to the base fields to generate an output. The output includes the parsed log record, the base fields, base field values, the sub-fields and the sub-field values are presented to a user. The sub-parsers extract the additional fields from the log records that are useful for the log analytics and needed by the users.

The output displays the extracted fields and the field values of the log records using various base parsers and the sub-parsers. The output presents the extracted message in a clear and properly indented manner. This helps the users to manually identify the sub-parsed fields from the base fields.

In the following description, for the purposes of explanation, specific details are set forth in order to provide a thorough understanding of certain aspects. However, it can be apparent that various aspects may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other aspects or designs.

Some embodiments relate to processing of "log" data and/or log messages. A log message can include a set of log data that is configured to be or has been written to a log (e.g., in a time-ordered and/or real-time manner). Log data may include multiple components that each correspond to a field. Log data may include one or more field tags that identify a field and/or one or more field values that include a value for a particular field. A log message may include (for example) a record from an event log, a transaction log, or a message log. In some instances, log data in each of one, more or all log messages represents an event (e.g., powering on or off of a device or component, a successful operation having been completed by a device or component, a failure of an operation having been initiated at a device or component, receiving a communication from a device or component, or transmitting a communication to a device or component). Log data may further identify (for example) a time stamp, one or more devices (e.g., by IP address) and/or one or more devices or operation characteristics (e.g., identifying an operating system or browser).

As noted above, many types of computing systems and applications generate vast amounts of data pertaining or resulting from operation of that computing system or application. These vast amounts of data are then stored into collected locations, such as log files, which can be reviewed at a later time period if there is a need to analyze the behavior or operation of the system or application. Embodiments of the present invention provide an approach for collecting and processing these sets of data in an efficient manner. While the below description may describe the disclosure by way of illustration with respect to "log" data, the disclosure is not limited in its scope only to the analysis of log data, and indeed is applicable to a wide range of data types. Therefore, the disclosure is not to be limited in its application only to log data unless specifically claimed as such. In addition, the following description may also interchangeably refer to the data being processed as "records" or "messages," without intent to limit the scope of the disclosure to any particular format for the data.

FIG. 1 illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each client that needs the service does not need to individually install and configure the service components on the client's own network. The log analytics system 101 is capable of providing the log analytics service to multiple separate clients and can be scaled to service any number of clients.

Each client network 104 may include any number of hosts 109. The hosts 109 are the computing platforms within the client network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each client network 104 to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, tablet computers, smartphones, mobile devices, or remote computing terminals. The user station 103 can include a display device, such as a display monitor, for displaying a user interface to users at the user station 103. The user station 103 also can include one or more input devices for the user to provide operational control over the activities of the system 100, such as a touchscreen, a pointing device (e.g., mouse or trackball) and/or a keyboard to manipulate a pointing object in a graphical user interface to generate user inputs. In some embodiments, the user stations 103 may be (although not required to be) located within the client network 104.

The log analytics system 101 can include functionality that is accessible to users at the user stations 103, e.g., where log analytics system 101 is implemented as a set of engines, mechanisms, and/or modules (whether hardware, software, or a mixture of hardware and software) to perform configuration, collection, and analysis of log data. A user interface (UI) mechanism can generate the UI to display the classification and analysis results, and to allow the user to interact with the log analytics system 101.

Figure 2:
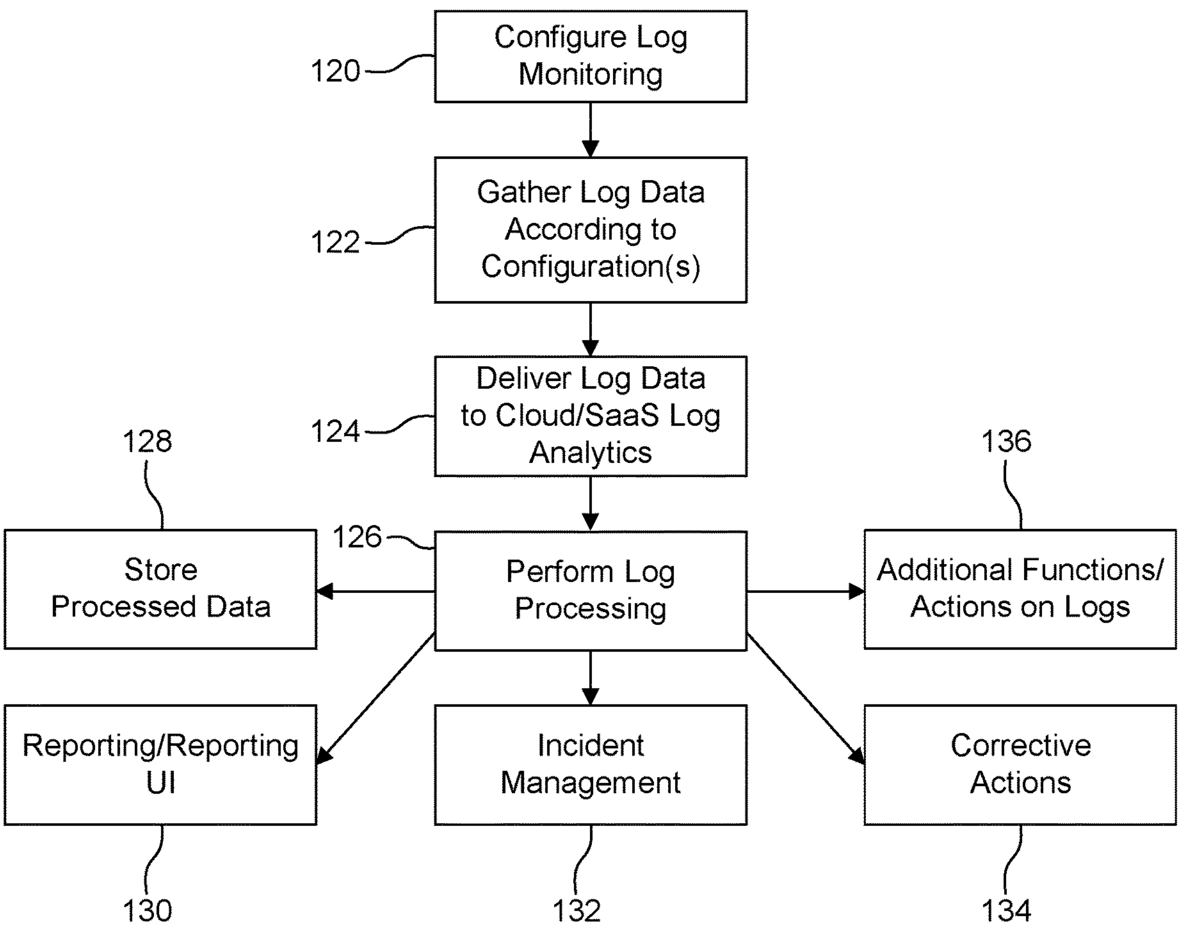
FIG. 2 illustrates a flowchart of a method which may be employed in some embodiments of the invention.

FIG. 2 illustrates a flowchart of an approach to use system 100 to configure, collect, and analyze log data. This discussion of FIG. 2 will refer to components illustrated for the system 100 in FIG. 1.

At block 120, log monitoring can be configured within the system 100. This may occur, for example, by a user/client to configure the type of log monitoring/data gathering desired by the user/client. Within the log analytics system 101, a configuration mechanism 129 comprising UI controls is operable by the user to select and configure log collection configuration 111 and target representations 113 for the log collection configuration.

As discussed in more detail below, the log collection configuration 111 comprise the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include client-defined/client-customized rules.

The target representations 113 identify "targets", which are individual components within the client environment that contain and/or produce logs. These targets are associated with specific components/hosts in the client environment. An example target may be a specific database application, which is associated with one or more logs and/or one or more hosts.

The ability of the current embodiment to configure log collection/monitoring by associating the targets with log rules and/or log sources provides unique advantages for the invention. This is because the user that configures log monitoring does not need to specifically understand exactly how the logs for a given application are located or distributed across the different hosts and components within the environment. Instead, the user only needs to select the specific target (e.g., application) for which monitoring is to be performed, and to then configure the specific parameters under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

The next action at block 122 is to capture the log data according to the user configurations. The association between the log rules 111 and the target representations 113 is sent to the client network 104 for processing. An agent of the log analytics system 101 is present on each of the hosts 109 to collect data from the appropriate logs on the hosts 109.

In some embodiments, data masking may be performed upon the captured data. The masking is performed at collection time, which protects the client data before it leaves the client network 104. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At block 124, the collected log data is delivered from the client network 104 to the log analytics system 101. The multiple hosts 109 in the client network 104 provide the collected data to a smaller number of one or more gateways 108, which then sends the log data to edge services 106 at the log analytics system 101. The edge services 106 receives the collected data from one or more client networks 104 and places the data into an inbound data store for further processing by a log processing pipeline 107.

At block 126, the log processing pipeline 107 performs a series of data processing and analytical operations upon the collected log data, which is described in more detail below. At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110*a* (e.g., as a SOLR cluster) and a raw/historical data store 110*b* (e.g., as a HDFS cluster).

At block 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At block 132, incident management may be performed upon the processed data. One or more alert conditions can be configured within the log analytics system 101 such that upon the detection of the alert condition, an incident management mechanism 117 provides a notification to a designated set of users of the incident/alert.

At 134, a Corrective Action Engine 119 may perform any necessary actions to be taken within the client network 104. For example, a log entry may be received that indicates that a database system is down. When such a log entry is detected, a possible automated corrective action is identified to attempt to bring the database system back up. The client may create a corrective action script to address this situation. A trigger may be performed to run the script to perform the corrective action (e.g., the trigger causes an instruction to be sent to the agent on the client network to run the script). In an alternative embodiment, the appropriate script for the situation is pushed down from the server to the client network 104 to be executed. In addition, at 136, any other additional functions and/or actions may be taken as appropriate based at last upon the processed data.

Various use cases in FIGS. 3A-3D are shown for original logs and their corresponding wrapped logs that are provided to the log analytic system 101. For example, docker, Kubernetes, non-Kubernetes, and cloud. The docker provides the ability to package and run applications in loosely isolated environments called containers. Logging is an important element of containerizing applications, as it helps developers keep track of patterns and troubleshoot issues. To fetch the logs of a container, commands such as docker logs and docker service logs shows the container's standard output (STDOUT) and standard error output (STDERR). The docker includes multiple logging mechanisms called logging drivers that are used to send logs to a file, an external host, a database, or any another logging backend for example, the log analytics system 101. The docker uses the JSON-file logging driver, which writes container logs to files in JSON format as well as supports many other drivers.

Figure 3A:
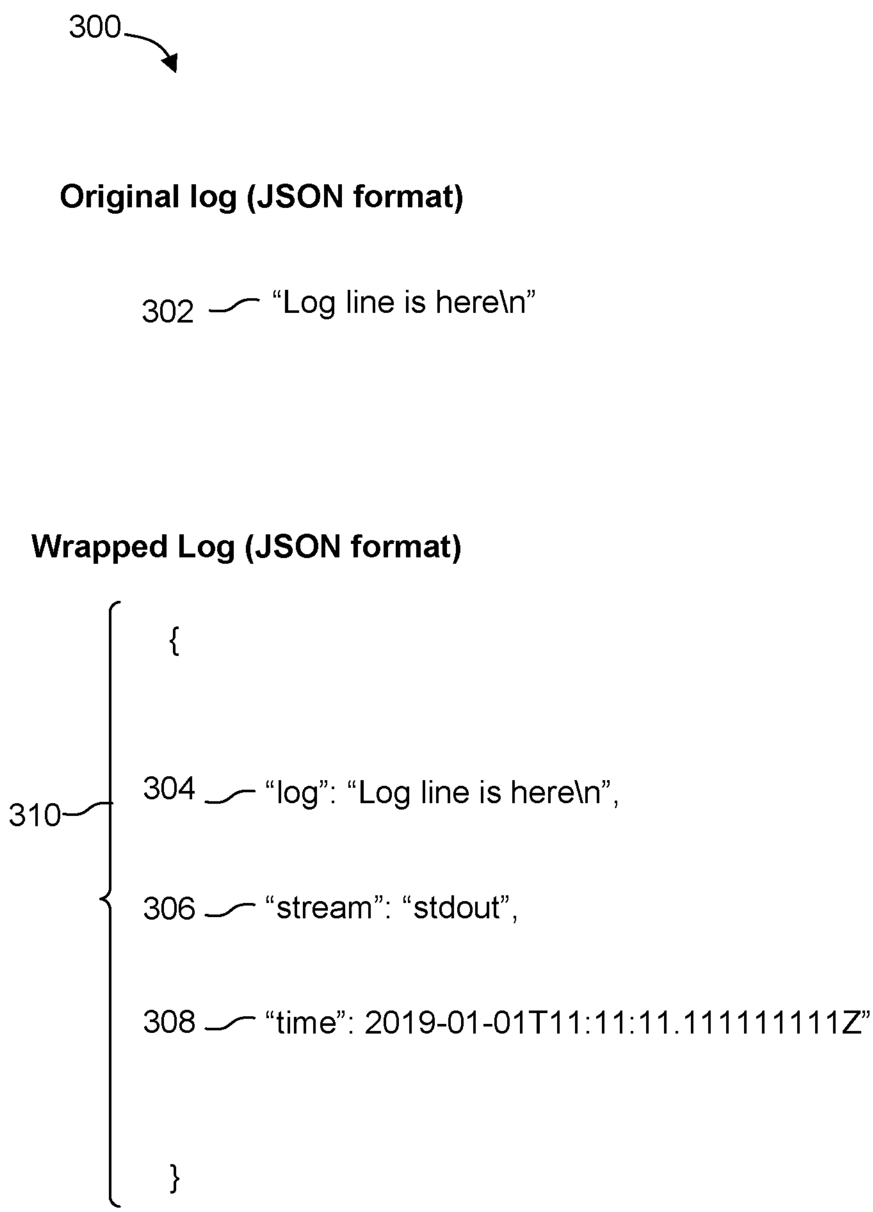

FIG. 3A is an exemplary extracted data log illustrating an array of JSON log records 300. JSON, syslog, and XML are all possible file formats. JSON logs can be used to store and maintain data in a human-readable text format. The format consists of attributes and their data types stored in the form of an array. FIG. 3 is an example of a JSON-file logging driver that indicates original container log 302 wrapped in a JSON format log 310. The original log "Log line is here" is annotated with its origin (stdout or stderr), timestamp and logged in JSON format. The original text is wrapped before it is available for processing by the log analytics system 101. The wrapped log 310 includes log 304 "log line is here", stream 306 "stdout", and time 308 "2019-01-01T11:11:11.111111111Z".

FIG. 3B is an exemplary extracted data log illustrating an array of syslog log records 320. The syslog writes log messages to syslog server. The syslog's original message can originate from a variety of sources and can be in different formats. For example, an outer format is syslog and the message has its own format like rsyslog, crio and kubelet. The original log is annotated with additional metadata like the timestamp, hostname, service etc. The original rsyslog 322 is transformed into wrapped rsyslog 324.

FIG. 3C is an exemplary extracted data log illustrating an array of crio log records 330. Similar to the syslog log records 320 of FIG. 3B, the original crio 332 is transformed into wrapped rsyslog 334. FIG. 3D illustrates an array of kubelet log records 340, in which original kubelet log record 342 is transformed into wrapped kubelet log record 344.

FIG. 4A is an exemplary extracted data log illustrating an array of Kubernetes log records 400. The containers running on Kubernetes worker nodes typically write their logs to the standard output and standard error streams. By default, these streams are captured by the container runtime. As Kubernetes is designed to be a flexible and extensible platform, it supports multiple container runtimes such as Docker, CRI-O (Container Runtime Interface) standard, which defines the interface between Kubernetes and container runtimes, etc. These container runtimes provide support for multiple logging drivers and therefore output the original logs in varied formats. Each line has an additional timestamp, origin (stdout or stderr) and a logtag. The format does not change though. The original logs (kube-proxy logs) 402 get converted into wrapped kube-proxy logs 404 before they are available for processing by the log analytics system 101.

FIG. 4B is an exemplary extracted data log illustrating a CRI-O container runtime in Kubernetes 410. FIG. 4B shows an example of the Container Storage Interface (CSI) Node Driver log 410. The original container logs (CSI Node Driver logs) 412 get converted into wrapped CSI Node Driver logs 414 before they are available for processing by the log analytics system 101.

FIG. 5 is an exemplary extracted data log illustrating an array of non-kubernetes log records 500, including Oracle Identity Cloud Service (IDCS) log 500. In the IDCS log 500, XML log content 504 is embedded within plain text log 502. A simple regular expression based parser would not suffice in this case. The XML fragment 504 would require to be sub-parsed starting with the ReleaseLine element within the individual plain text log records 502.

FIG. 6 is an exemplary extracted data log illustrating a pre-wrapped and post-wrapped Weblogic Server logs 600. Many of the prominent cloud providers have in-house logging and event management services which help the users to proactively monitor their cloud resources. In an example, Oracle Cloud Infrastructure's (OCI) Logging service and Microsoft Azure Event Grid support CloudEvents 1.0 specification to provide interoperability across systems. The OCI Logging service normalizes every log line into a common event format i.e. "CloudEvents 1.0" for ease of correlation.

FIG. 6 illustrates pre-normalized and post-normalized WebLogic server log 600 when it's ingested into the OCI Logging service. The original pre-normalized log 602 includes the message for the extraction. However, after normalization, the post-normalized log 604 includes the message segregated under a "msg" field which can be easily recognized by the user. Apart from the "msg" various other fields like "action", "data", "id", "source", and "time" etc. are extracted.

The CloudEvents format provides standardization and protocol-agnostic definition, it adds an outer envelope around the original log being ingested. If the normalized logs were to be routed to additional log analytics solutions for further analysis, it poses an additional challenge of dealing with the outer envelope and extracting the relevant fields from the inner "msg" attribute in the FIG. 6. With the standard JSON based structured parsing support, many logging analytics solutions can extract the JSON attributes as log fields.

However, the solutions are not sufficient. The user ends up getting the "msg" attribute as a log field with the attribute value as the field value. The "msg" field's value is the original log content and the user would require support for sub parsing this value. To add to the complexity, the values could be in different formats like plain text, JSON, XML, delimited etc. A support for varied combinations for the outer envelope format and for the inner payload (i.e., attribute value) is built while performing field extraction of the log records.

The log analytics system 101 provides a solution to the efficient parsing of the log records by configuration of multiple parsers to sub-parse the log records at ingestion/processing time. The log records wrapped in same or different types of outer envelope and the inner payload are parsed by user-configured parsers. Initially, the wrapped log records are parsed by an outer parser or base parser. The outer parser identifies boundaries of the log records and field extraction. Further, the fields of the log records are extracted by the outer parser, the fields specific sub-parser is identified from the fields.

The sub-parser is used to further extract sub-fields and merge them with the fields from outer or base parser to generate an output. The identification of the sub-parsers and extraction of the sub-fields is recursively performed. The output is presented to the user on the user interface which provides the users with strong support to parse wrapped logs with ease. Since the parsing and sub parsing of the log records is done at the time of log data ingest and before it's indexed, it would be highly scalable and efficient. The log analytics system 101 has many predefined parsers that can be readily reused for sub-parser which reduces configuration time and further maintenance.

Figure 7A:
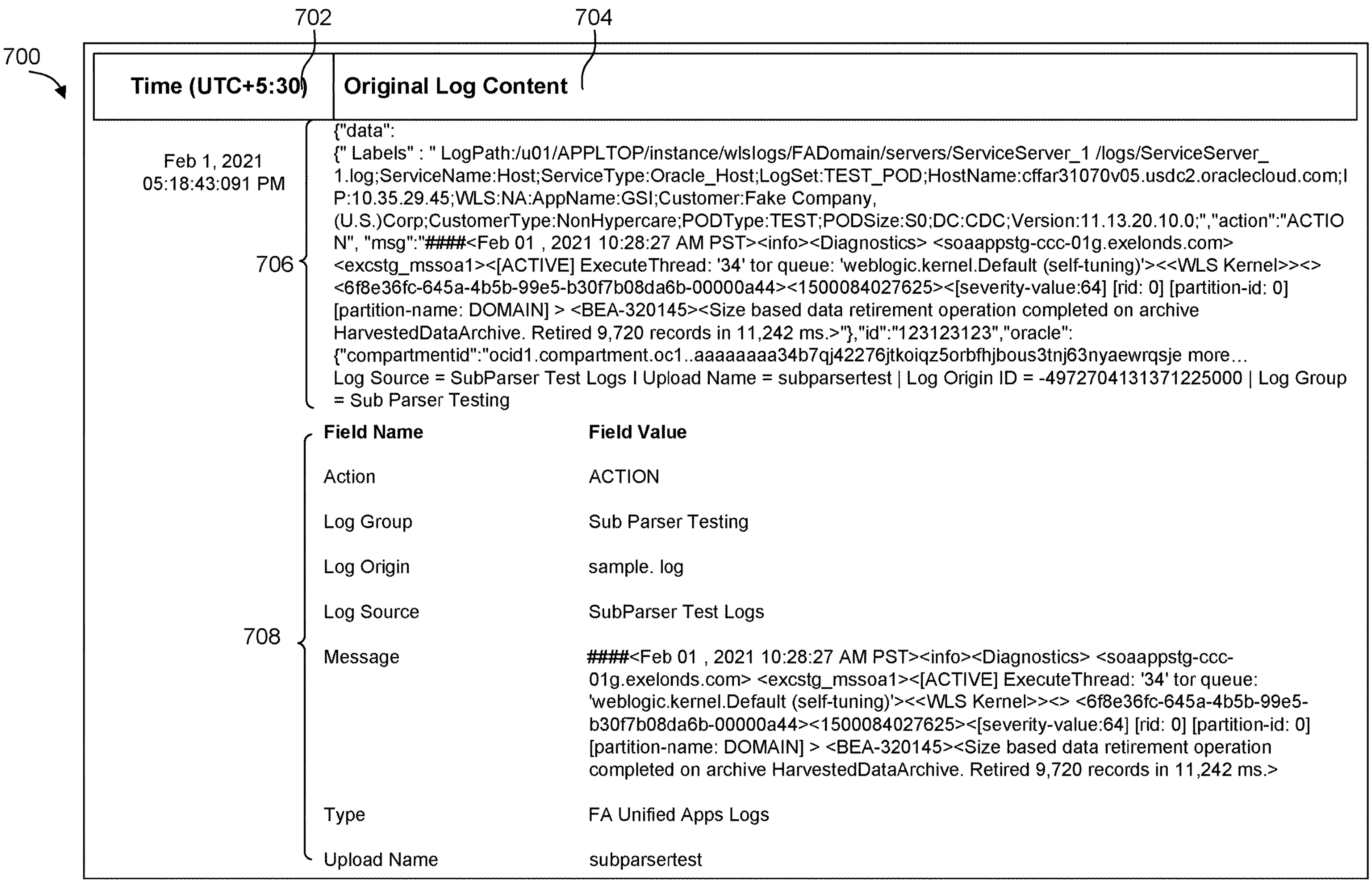
FIG. 7A illustrates a graphical representation of a WebLogic server log wrapped in a JSON envelope without sub-parsing.

FIG. 7A illustrates a graphical representation 700 of a WebLogic server log wrapped in a JSON envelope without sub-parsing. The original WebLogic server log is in plain text format and available in the "msg" attribute of the outer JSON envelope. The "msg" attribute value is JSON escaped. When a JSON parser is used to parse such a log record, the fields extracted can be, including the "msg" attribute which is seen as "Message" field. The issue with the extraction is that the "Message" field value is the complete original log and hasn't been parsed any further, preventing further analysis. With the sub parsing support in place, the original log which is wrapped in a JSON envelope can be easily sub-parsed. All the sub-fields obtained by running the sub-parser over the value of $.data.msg attribute are merged with the fields from the outer parser and a consolidated set is available to the user for further analysis. The sub-parsed fields can further be indented so it provides direct feedback to the user. The fields extracted with the outer parser are at the normal level and the fields extracted through the sub-parser are indented.

Figure 7B:
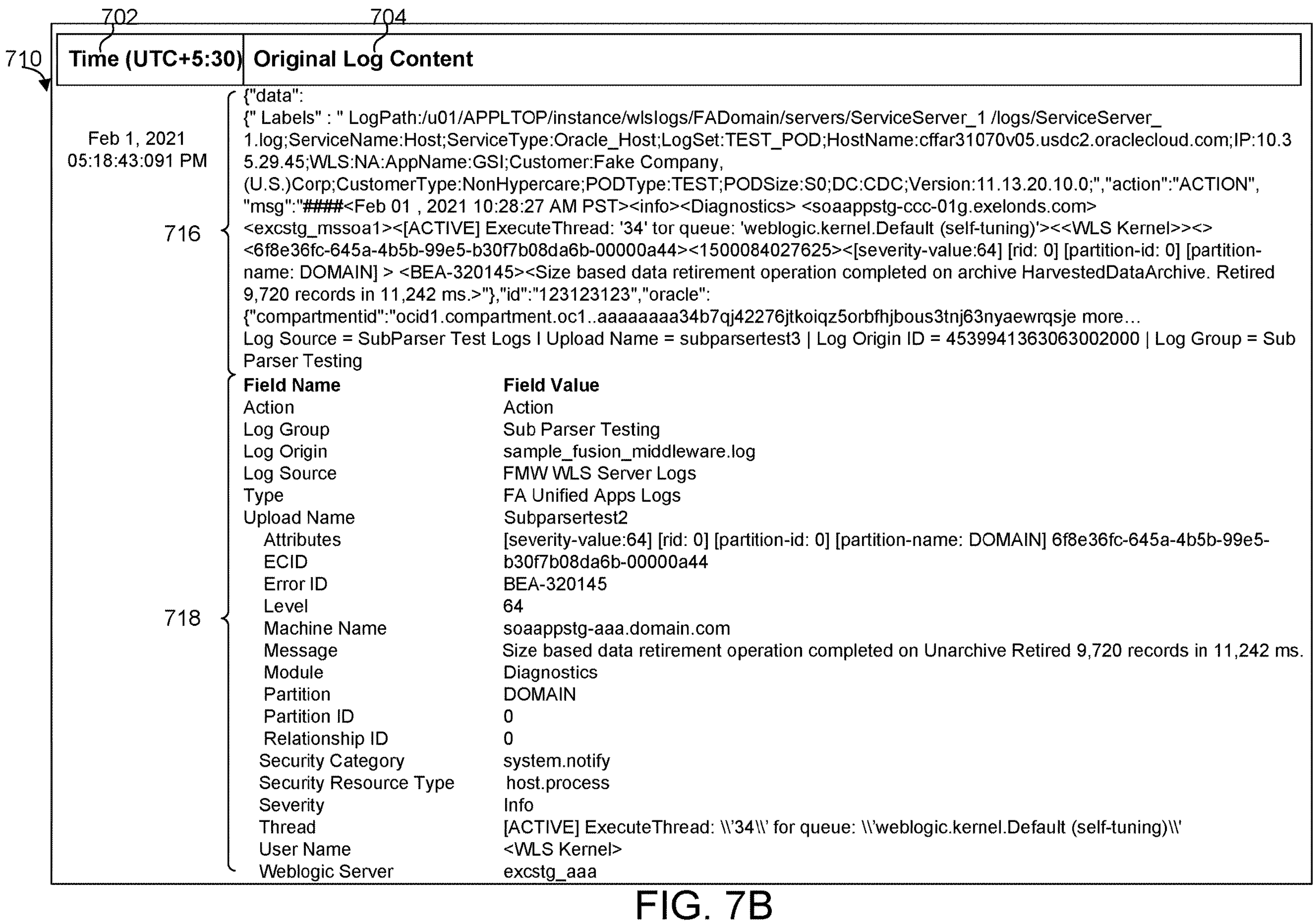
FIG. 7B illustrates a graphical representation of the earlier WebLogic server log wrapped in a JSON envelope with sub-parsing.

The original log message 704 and its timestamp 702 is displayed in the graphical representation. The original WebLogic server log wrapped in plain text 706 is processed through the log analytics system 101 to sub-parse the "msg". The sub-parsed message 708 is shown as a field value. The extracted message value clearly indicates the message from the wrapped log. The message is easily extracted and provided for further analysis. Similarly, FIG. 7B illustrates a graphical representation of the earlier WebLogic server log of FIG. 7A wrapped in a JSON envelope with sub-parsing 710. The original log content is the WebLogic server log wrapped in plain text 716. The sub-parsed message 718 is shown as a field value. The extracted message is indented to clearly indicate the message. The original log message 704 is timestamped 702 and shown in respective fields on a user interface (UI).

FIG. 7C illustrates a Kubernetes container log snippet 720. The Fluentd "match" configuration is split across multiple lines. If each of these log lines is collected as a log record, it would be ineffective. The sub-parser support could be used to configure a multiline start expression which combines multiple log lines into a single log record and then parse it which results in more meaningful results.

For the example container log snippet 720, a multiline start expression could be \d{4}–\d\{2}–\{2}\T\d\{2}:\d{2}: \d{2}.\d+Z\s\w\+s\w\s+\d{4}–\d{2}–\d{2}\s\d{2}:\d{2}: \d{2} This would only match the first log line and combine multiple log lines into a single log record 730 as shown in FIG. 7D. FIG. 7D illustrates a graphical representation of the processed log record 730. This support would come in handy to handle other use cases like stack traces as well.

Figure 8:
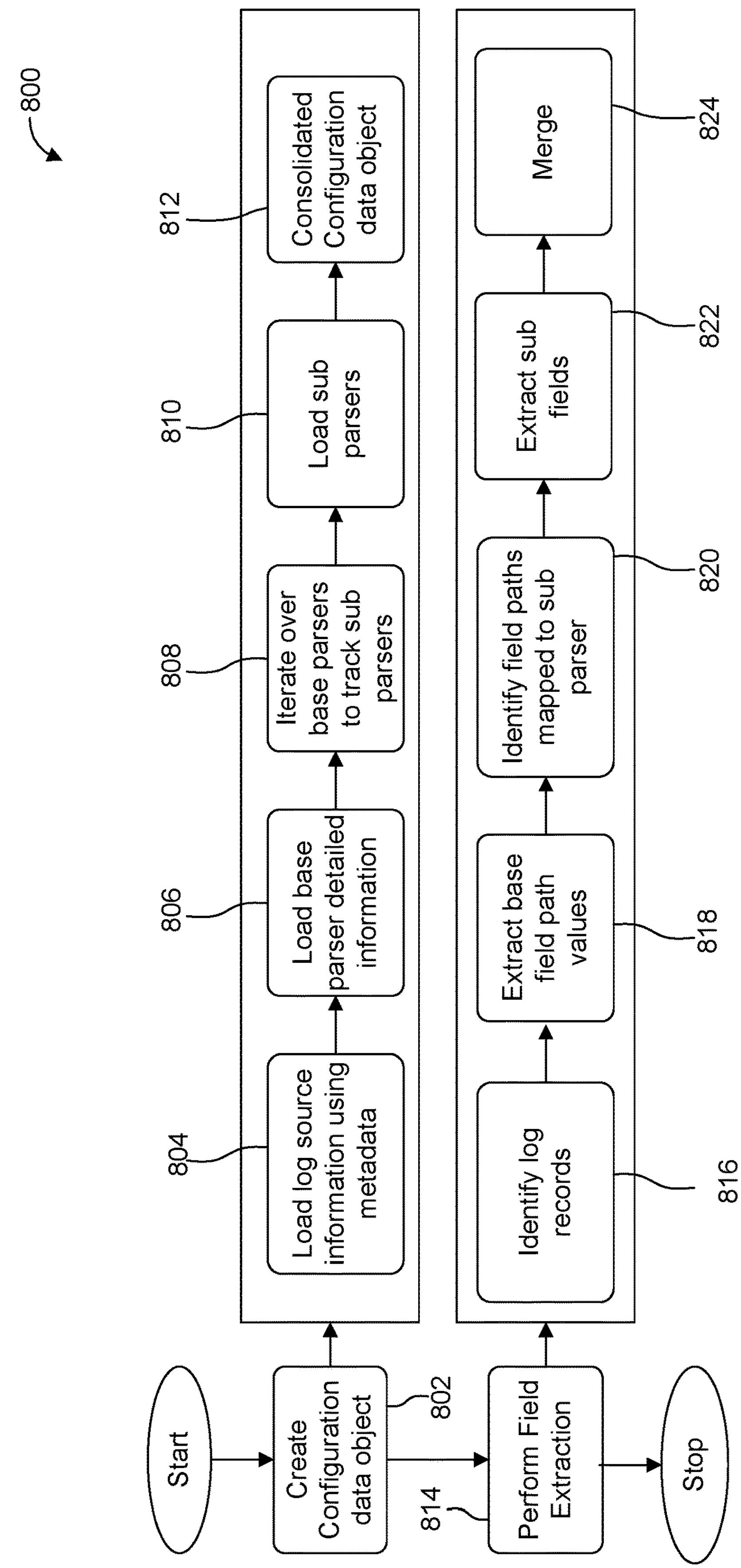
FIG. 8 illustrates an exemplary flow for defining configuration data and performing field extraction of log records.

FIG. 8 illustrates an exemplary flow 800 for defining configuration data and performing field extraction of log records. The creation of the configuration data object can be performed in FIG. 9 and the field extraction can be performed in FIG. 10. A configuration data object is created that includes details of the log source, its parsers including the base parsers and the sub-parsers. The configuration data object is used at the time of log processing. The creation of the consolidated data object followed by the field extraction is performed in the system and computer-implemented method for multiple parsing of the log records. The definition of configuration data can include configuring a system with detailed information on sub-parsers, base parsers, and log source of the log records. A solution to the problem of extracting a message log wrapped in different layers of JSON/XML/regex or other types of log records can be provided. The user can configure multiple parsers to sub-parse a log record at ingestion time. When one or more sub-parsers are used within a base parser which in turn is included in the log source, the consolidated configuration data needs to include details of the sub-parsers as well. The details of the sub-parsers, the base parsers and the log source are defined in the configuration data object.

At block 802, a configuration data object is created. Creating the configuration data object can include performing actions from blocks 804-812. At block 804, for a given log source, its detailed information is loaded using metadata. The log source is used to define log file locations and parsing and enriching the logs while ingesting them. The metadata is used to acquire detailed information of the log source. The detail information includes base parser references for base parsers configured in the log source.

At block 806, for every base parser referred to in the log source, the base parser detailed information including base parse expression, field mappings etc. is loaded. Field mappings include one or more fields mapped to a base parser. The field values of the one or more fields may be further mapped to one or more sub-parsers.

At block 808, an iteration is performed over every base parser reference to keep a track of the sub-parsers configured using the field mappings. One or more base parsers may include sub-parsers. The base parsers information includes sub-parsers configured for sub parsing the log records parsed by the base parsers.

Once the base parsers information collection is completed, the iteration is done on the sub-parsers and the sub-parsers are loaded at block 810. The sub-parsers are mapped to the base fields of the base parsers.

A consolidated configuration data object is created at block 812, which has details of the log source, and its parsers (base and sub-parsers). The configuration data object is used at the time of log processing.

At block 814, field extraction is performed using the base parsers and the sub-parsers. Extracting the fields can include performing actions from blocks 816-824. The log data would be parsed by an outer or a base parser. Initially, the outer parser detects the log record boundaries and performs field extraction. Detecting the boundaries of the log record is key to identify the parts of the log records. The log records are received from the edge services 106 and the log processing pipeline 107 are unsorted and includes huge combinations of log records with other data log. The base parser filters the log records to remove duplicate log records and parse the log records to extract fields. After the fields are extracted by the outer parser, the fields specific sub-parser would be used to further extract sub-fields and merge them with the fields from outer parser. This would be done in a recursive fashion.

At block 816, log records are identified within the log data with the base parser or outer parser. The outer parser type (regex, JSON, XML etc.) depends on the format of the outer envelope of the log record. The base parser is used on the log record depending on the type of outer envelope wrapping in the log record. For example, regex type wrapping on the outer envelope of the log record will require a regex type base parser or outer parser.

At block 818, each of the log records is run through the base parser or outer parser to extract the base field path values. The base field path values include values corresponding to the base field's names selected by the user while creating the base parser.

At block 820, the base fields and the base fields path values that are extracted at block 818 are mapped to a sub-parser as part of the base parser definition. The sub-parser type (regex, Json, XML etc.) depends on the value of the field mapped to the sub-parser. The sub-parser is used to extract the message from the message field that is wrapped within the outer envelope.

At block 822, the base fields value which is a log record for the sub-parser are parsed through the sub-parser to extract the sub-fields. The sub-parsers are recursively checked as each of the sub-parsers could have another sub-parser defined. When all sub-parsers are run on the log records, the process ends.

At 824, the sub-fields are merged with the base fields to generate a result. The result is provided for further log analysis within the log analytics system 101. The result is displayed as output to the user on the user interface. The output for example is shown in FIG. 7C.

The message field is separated from the other fields and is clearly extracted under the message field. The other field values are mentioned under the respective fields. The fields and their values are well distinguished and properly indented in the output. The output representation shows the extracted field values from the base parsers and the sub-parsers when run on the wrapped log records. The meaningful output provides the user with an enhanced output to analyze the log records rather than go through the tedious task of extracting the field values from the wrapped log records manually.

Figure 9:
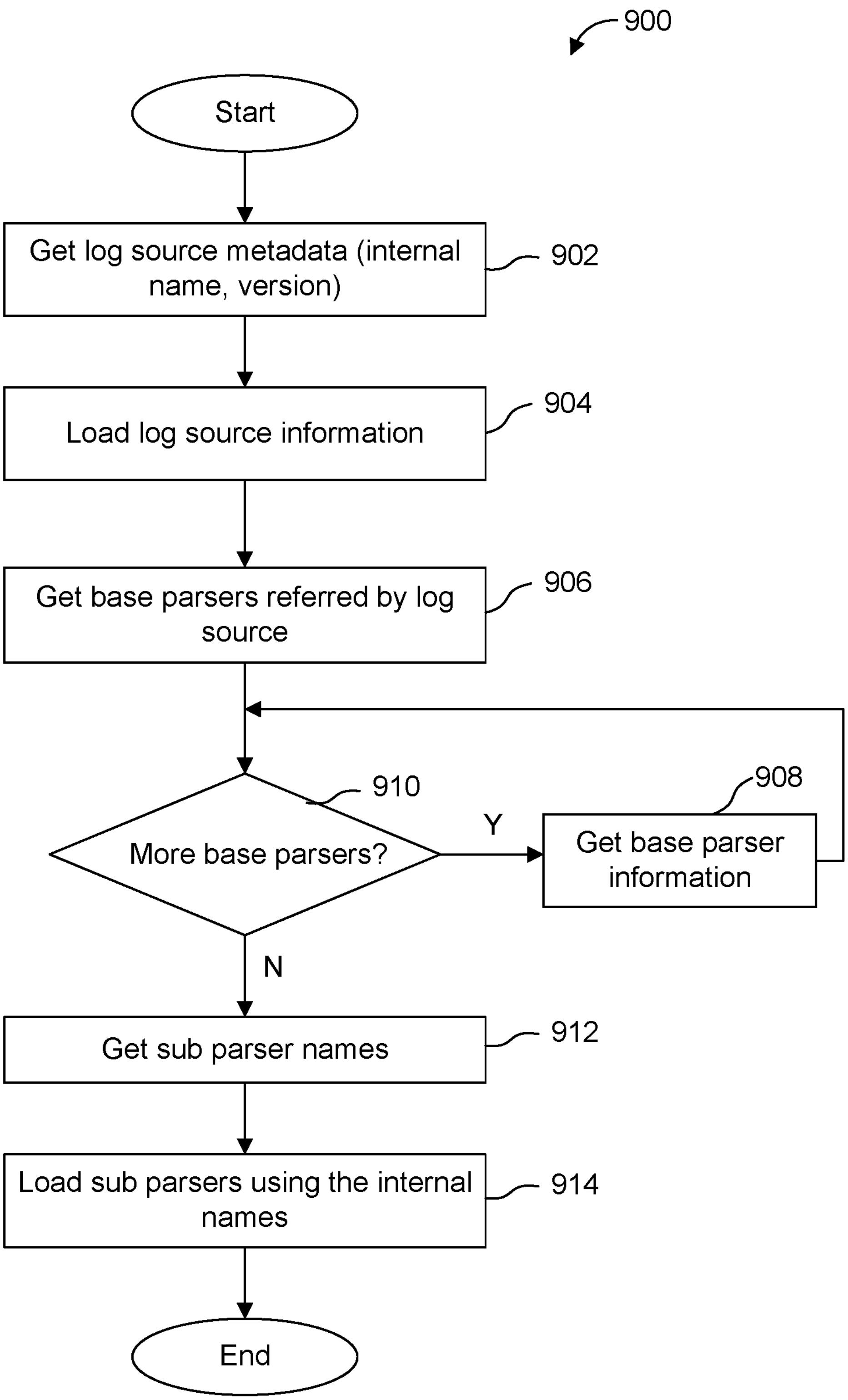
FIG. 9 illustrates an exemplary flow for creating configuration data object.

FIG. 9 illustrates an exemplary flow 900 for creating configuration data object. The log analytics system 101 can have many predefined parsers that can be readily reused as sub-parser which reduces configuration time and further maintenance. A log source is used to define log file locations, parsing and enriching the logs while ingesting them. One or more log parsers are associated with a log source. During processing, a consolidated configuration data is prebuilt and is used to process the logs at the time of processing. The processing includes parsing, extraction, enrichment, etc. of the log records. The consolidated configuration data object includes detailed information of the sub-parsers.

The log source includes configured base parsers, and the base parsers include configured sub-parsers within the base parsers. The base parsers and the sub-parsers are used to parse the wrapped log records. For example, JSON log wrapped in a plain text log or regex log wrapped in XML log. The detailed information of the sub-parsers, the base parsers, and the log source is predefined and built within the configuration data object. This configuration data object is used during the field extraction from the log records. The configuration data object is built depending on the log source. The parser is user configured to handle the ingested log.

At block 902, metadata of the log source is acquired. Internal names and versions of log files from the edge services 106 are included in the metadata. Log source includes the information on the source from where the logs are generated for example, the client network 104 including the host 109 and the gateway 108. The boundaries of the log records that are required to be parsed are identified from log source using the metadata. The log records include huge data in the raw form which entirely may not be required for processing. The log records are received in the form of a log stream including log files. Further, multiple occurrences of these files are received. The log records that are required for processing are restricted within the boundaries to ease the processing.

At block 904, log source information is acquired and loaded where the log records are filtered based on the boundaries and acquired for parsing. The log source is important for deep analytics of the log records in the log analytics system 101. The log source information includes base parser references of base parsers used for parsing the log records.

At block 906, base parsers are identified from the log source information using the base parser references. The log source information includes information on the configured base parsers used to parse the outer envelope of wrapped log records. The outer envelope includes upper most layers of regex/XML/JSON/plain text etc. that wrap the log record. The inner layers of wrapping the log record are parsed using sub-parsers.

At block 910, one or more base parsers are identified for parsing the outer envelope of wrapped log records. Once the base parser is identified, the base parser information is acquired at block 908. The base parser information includes base parser paths and information on sub-parsers. The base parser information also includes the sub-parsers corresponding to each base parser.

At block 912, the sub-parsers are acquired from the base parser information. The sub-parsers configured for the corresponding base parsers are identified using the sub-parser names. The sub-parsers are used to parse the inner payload of the wrapped log record. The inner layer or the inner payload may be of regex/XML/JSON/plain text etc.

At block 914, the sub-parsers are loaded using the names of the sub-parsers. The sub-parsers are loaded on the inner payload of the wrapped log records. The sub-parsers extract the message from the log records that are meaningful for the log analytics. A configuration data object is created that includes details of the log source, its parsers including the base parsers and the sub-parsers. The configuration data object is used at the time of log ingestion.

Figure 10:
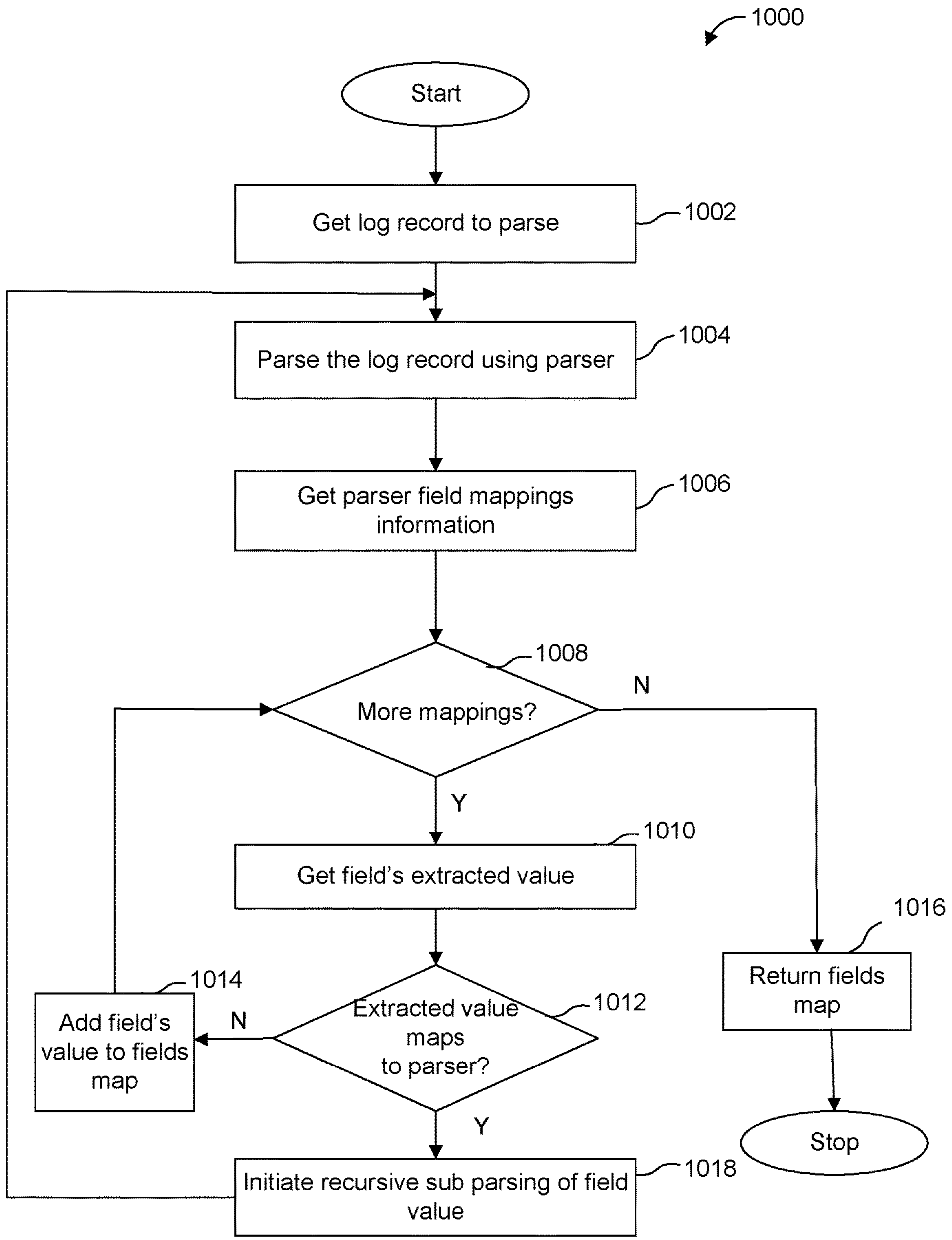
FIG. 10 illustrates an exemplary flow for field extraction of log records.

FIG. 10 illustrates an exemplary flow 1000 for field extraction of log records. After the configuration data object is created as shown in FIG. 9, field extraction is done. The log records are parsed using a log parser (including the base parsers and the sub-parsers) to extract fields and field values from the log records.

The field extraction starts at block 1002, where the log records are identified within the log data. The log records are wrapped with outer envelope and inner envelope or inner payload which can be regex, JSON, XML, plain text etc. The outer envelope of wrapped log records is parsed with a base parser or outer parser. The outer parser type (regex, JSON, XML etc.) depends on the format of the outer envelope. The inner parser type (regex, JSON, XML etc.) depends on the format of the inner envelope.

Figure 11A:
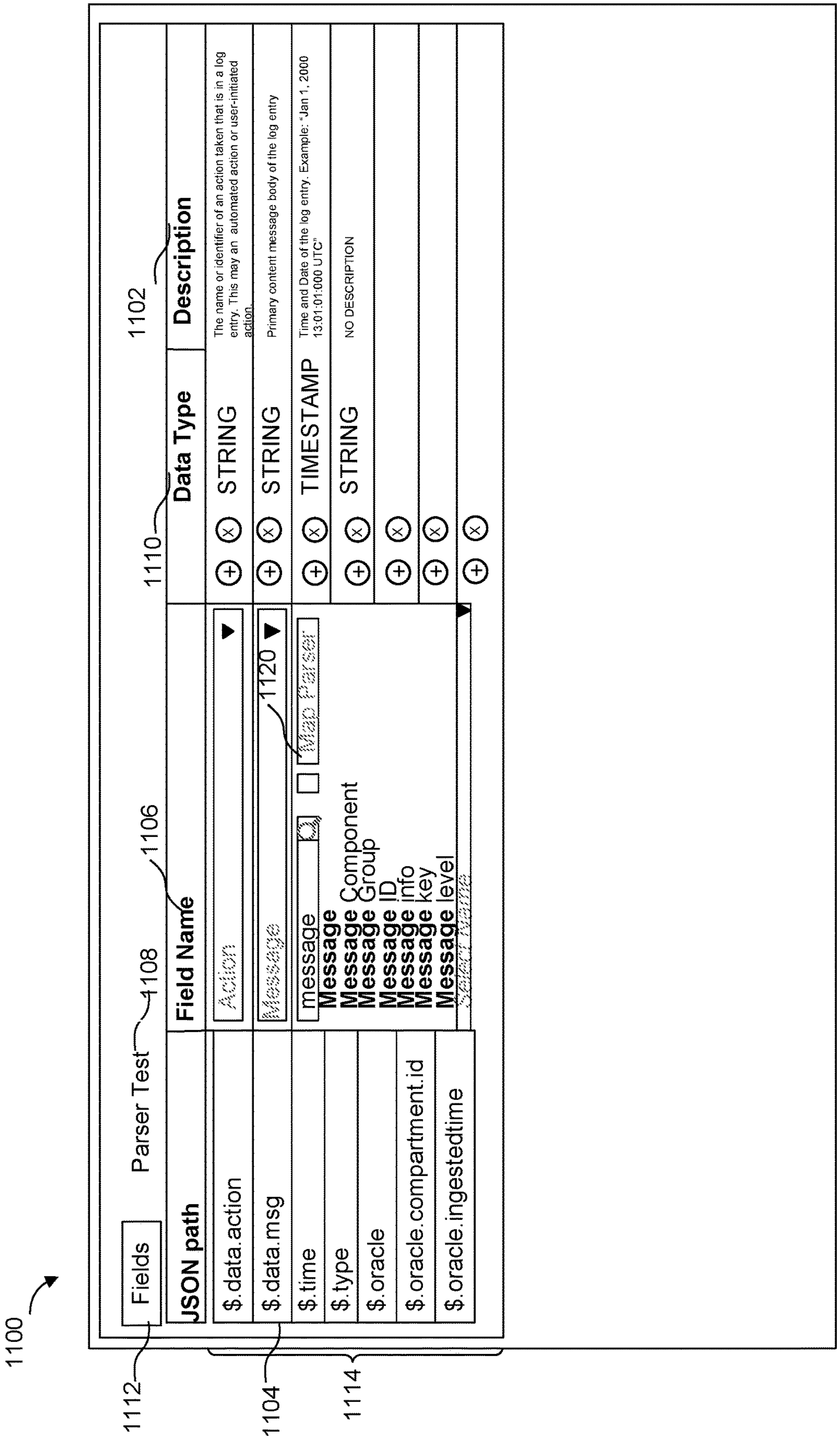
FIGS. 11A-11C illustrates an exemplary user interface.

At block 1004, the log records are parsed using the base parser. The outer envelope of the log records is parsed using the base parser. Each of the log records is run through the base parser to extract the base field path values. The base fields of the base parser are selected by the user during creation of the base parsers. The base fields have respective values. The base field path values define a path of selection of the fields and fields values. For example, JSON paths are mapped to fields. For example, $.data.msg is mapped to Message field as shown in FIG. 11A. At the time of data ingestion, the value corresponding to $.data.msg is extracted and indexed with the name Message.

At block 1006, the base parser's field mapping is obtained. The field mapping includes field values mapped to sub-parsers. For example, the user can either select a field or a sub-parser to map a JSON path to the field or the sub-parser. $.data.msg is then mapped to a sub-parser with the name "SubParser Test" instead of Message field. The type of the sub-parser is based on the type of value expected in the $.data.msg attribute.

At block 1008, field mappings of the other base parsers are identified. Sub-parsers of the base parsers are identified based on the field mappings. If the field mapping is not identified, it is returned to identify sub-parser at block 1016 and the process ends. If all the field mapping s have been identified then at block 1010, the field's extracted value is acquired using the field mapping. For example, for the Message field, $.data.msg is mapped to the message.

At block 1012, the base fields mapped to a sub-parser as part of the base parser definition are identified. The sub-parser type (regex, Json, XML etc.) depends on the value of the field mapped to sub-parser. For example, for the field value $.data.msg, the $.data.msg is mapped to a sub-parser with the name "SubParser Test".

At block 1014, when the extracted field value does not map to the sub-parser, the field's value is added to the field mapping. For example, for the field name "Action", the field value is "action" and the field value does not map to a sub-parser. In this case, the extracted field value "action" is added to the field mapping with field "Action".

At block 1018, when the extracted field value maps to the sub-parser, sub parsing of the field value is performed in order to identify all the sub-parsers. The base field's value which is a log record for the sub-parser is parsed using the sub-parser to extract the sub-fields. The field extraction is done recursively as each of the sub-parsers can have another sub-parser defined within it. The extracted sub-fields are merged with the base fields. An output is generated based on the extraction of the sub-fields and the base fields.

There are constraints that are set on an upper bound on the max depth up to which sub-parsers are supported. This is set due to recursive sub parsing and avoid getting into an infinite loop or a deadlock scenario. For example, for all practical purposes a depth of three would suffice. However, the upper bound can be made configurable and increased if needed.

The value of the field mapped to a sub-parser is a log record. Since the field includes the attribute of interest, its value is extracted. If the field maps to the sub-parser, then the log record of the field is further parsed using the sub-parser to extract the particular sub-field. In case of conflicts where the same field is obtained from both the base parser and the sub-parser, the more specific field will be considered i.e., the field that comes from the sub-parser.

Figure 11B:
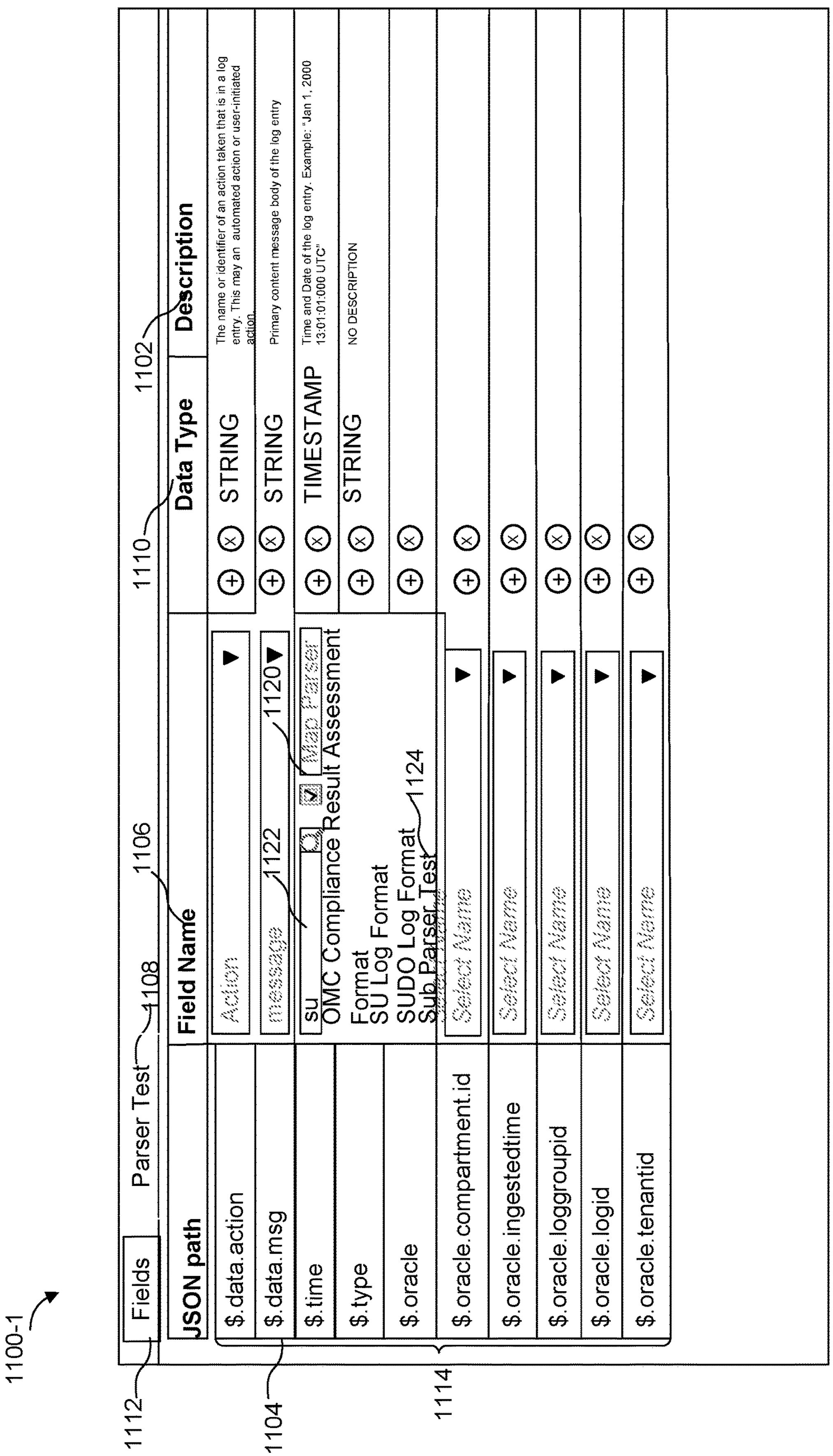
Figure 11C:
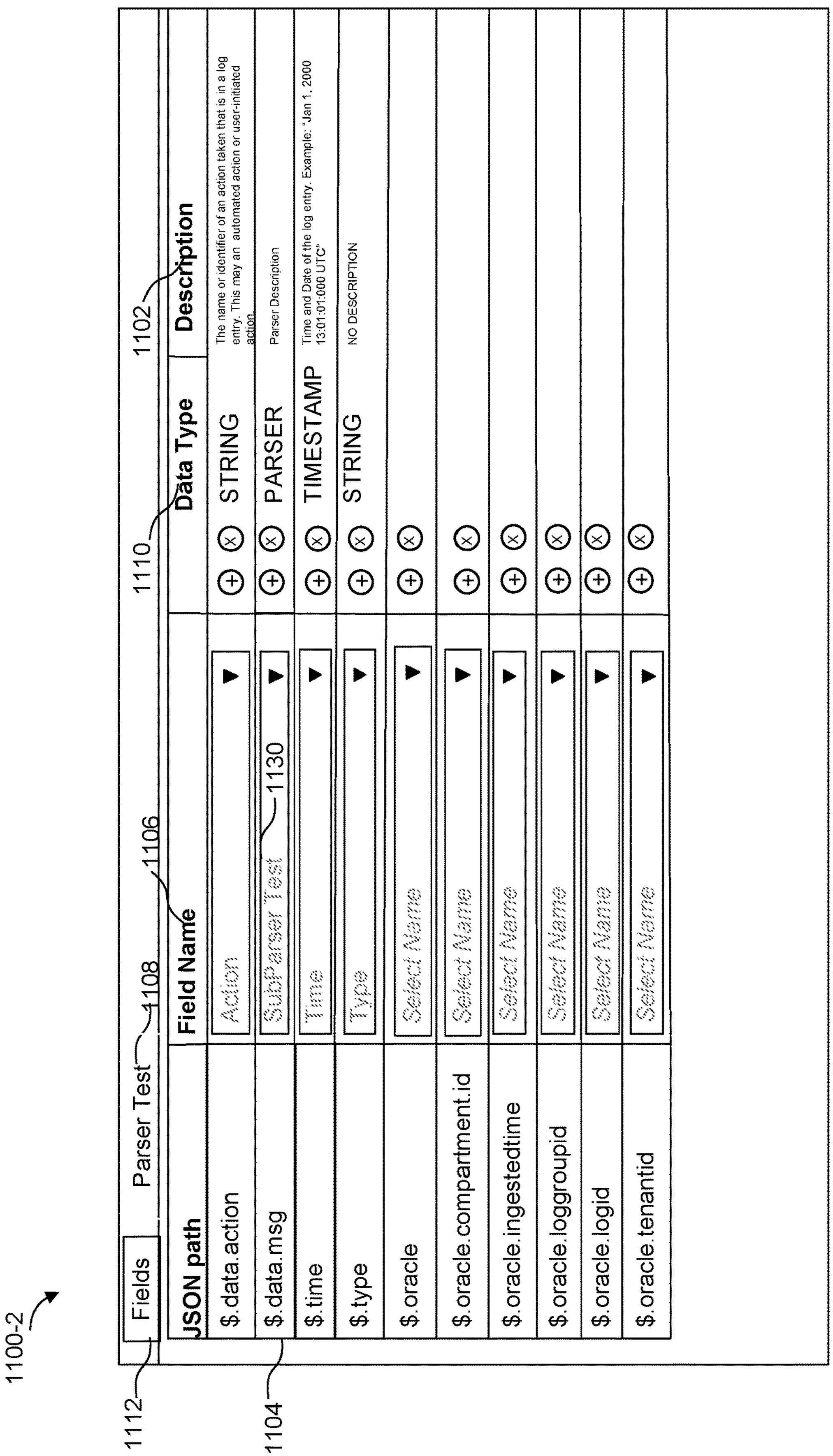

FIG. 11A illustrates an exemplary user interface 1100. FIGS. 11A-11C illustrates a manner in which the sub-parser is mapped in a parser through the user interface. While configuring the log parser, field mappings are created where the individual regex capturing groups/JSON paths/XML paths etc. are mapped to a field. The user selects a Field Name 1106 from the drop down menu. For example, in a JSON parser, various JSON paths 1114 are mapped to the fields 1112.

For example, $.data.msg 1104 is mapped to a Message field under Field Name 1106. At the time of data ingest, the value corresponding to $.data.msg 1104 is extracted and indexed with the name Message. When the $.data.msg is a JSON escaped string, it is extracted as in Message field as can be seen in FIG. 7A. The details of the Message field are indicated in Data Type 1110 with its corresponding Description 1102. The user interface 1100 includes a Parser Test button 1108 that runs the configured log parser for the selected fields to extract the message and displays the extracted message on the user interface 1100 to the user.

With the sub parsing support, the user has an additional option enabled by selecting the Map Parser checkbox 1120 to map Regex capturing groups/JSON paths/XML paths to a sub-parser instead of a field. As can be seen in the user interface 1100-1 of FIG. 11B, the user has an option to map a JSON path 1114 to a field or a sub-parser 1122. A list of all the existing parsers in the log analytics system 101 is displayed, enabling reusability. $.data.msg 1104 is then mapped to a sub-parser 1124 with the name "SubParser Test" instead of Message field. The type of the sub-parser is based on the type of value expected in the $.data.msg attribute. All the other JSON paths 1114 are mapped to the respective fields 1106. The sub-parser "SubParser Test" may have some of its fields 1106 mapped to other sub-parsers, illustrating the recursive nature of this support.

FIG. 11C shows the user interface mapping 1100-2, post mapping when the parser definition is saved and used to parse the logs. The "SubParser Test" 1130 is selected for sub parsing the log records and shows the parser and parser description in the Data Type 1110 and the Description 1102, respectively.

Figure 12:
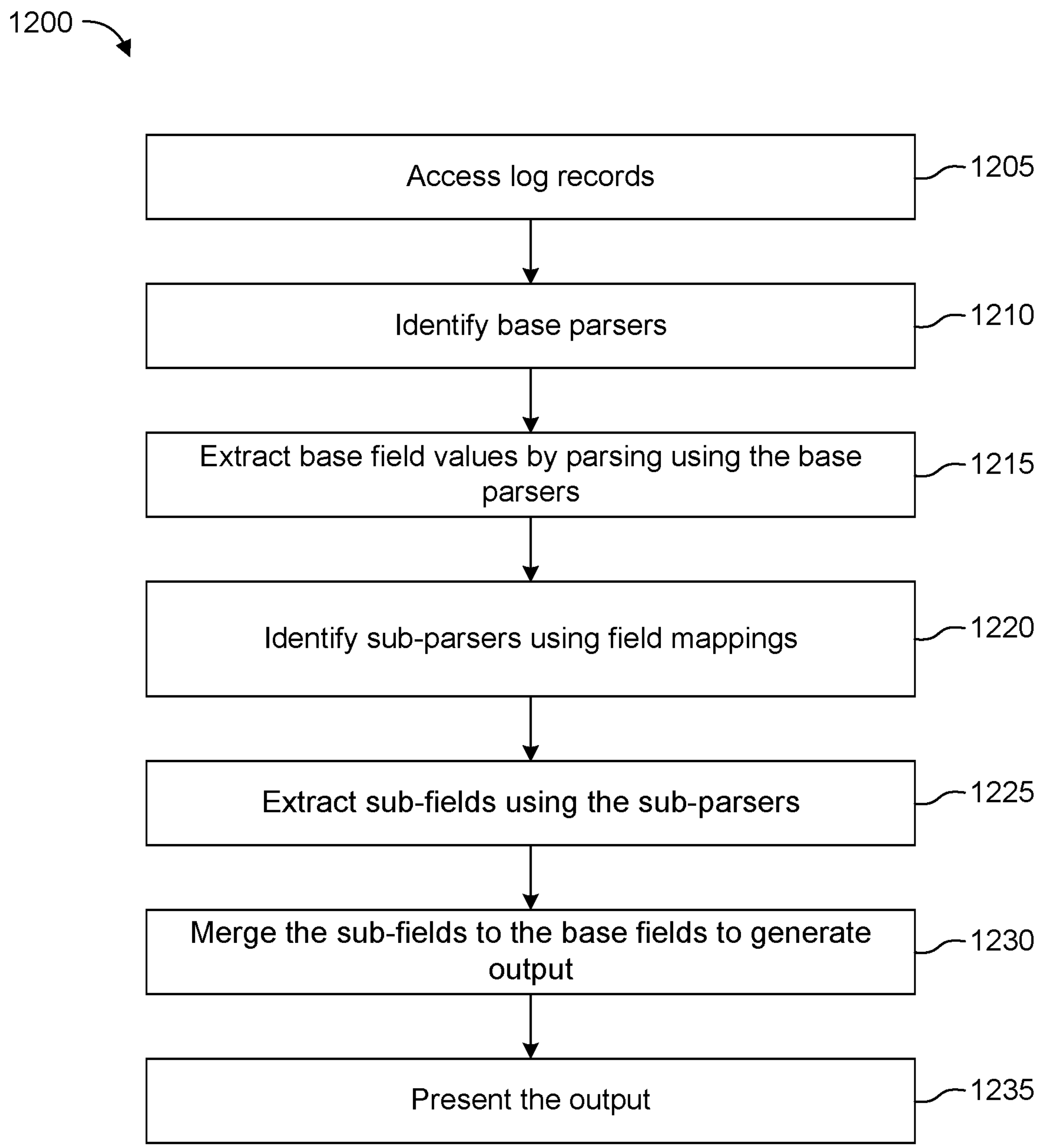
FIG. 12 illustrates an exemplary flow for data extraction from log records.

FIG. 12 illustrates an exemplary flow 1200 for data extraction from log records. The log records are received from the edge services 106. The boundaries of the log records are defined such that the log records can provide meaningful insights when filtered and analyzed. Duplicated log records are filtered out.

The log records are wrapped in the same or different type of outer envelope and inner envelope or inner payload. The outer and the inner envelopes may be regex, JSON, XML, plain text etc. The log records are provided to the log processing pipeline 107 from the edge services 106 for processing. The log records are received by the edge services 106 from the client networks 104. The client networks 104 includes the gateways 108 and the hosts 109.

At block 1205, the log records are accessed for extracting specific fields and their values. One or more parsers are run on the log records to extract fields and the field values. The log records are associated with the log source. The log records are wrapped with an outer envelope. The outer envelope and the inner payload are in the same or different type of formats such as Json, XML, regex, plain text etc.

At block 1210, a number of base parsers are identified for parsing a log record based on a type of the log record. The base parsers are user configurable and predefined. The type of the log record is indicated in the log source. The base parsers are used to parse the outer envelope of the log record. The log source includes information on the base parsers.

The configuration data object is created as shown in FIG. 9 before the field extraction is done as shown in FIG. 10. Initially, log source metadata associated with the log source is acquired. The log source metadata includes a name and version of data of the log source. Log source information using the log source metadata. The log source information includes base parser references of the base parsers. The base parsers are acquired using the log source information.

Further, base parser information of the base parsers is acquired. The base parser information includes the field mappings for each base parser of the log source. The sub-parsers of each of the base parsers are identified by iterating each base parser reference to identify corresponding sub-parsers. For the sub-parsers, the respective sub-parser information is acquired. The sub-parser information is a sub-parser name. The sub-parsers are loaded using the sub-parser information. The configuration data object is generated with details of the log source, the plurality of base parsers and the plurality of sub-parsers. The configuration data object is used at the log ingestion time.

At block 1215, the log record is parsed using the base parsers to extract base field values corresponding to base fields of the log record. A base-parsed log record is generated on parsing the log record using the base parsers. For example, a number of base fields such as $.data.action, $.data.msg, $.time, $.data.type, etc. have corresponding field values. $.data.msg has field values such as Message, Message Component, Message Group, Message ID, etc. as shown in FIGS. 11A-11C.

At block 1220, one or more sub-parsers are identified from the base fields using field mappings. The field mappings include one or more base field values of the base parsers mapped to a corresponding sub-parser. The field mappings are configured in the base parsers and identified from the base parsers. In the above example, on selecting a map parser 1120 option by the user on the user interface, "SubParser Test" is selected as shown in FIG. 11B. The "SubParser Test" is the sub-parser corresponding to the field value Message of the $.data.msg $.data.msg.

At block 1225, the base-parsed log record is further parsed using the one or more identified sub-parsers to extract sub-fields. Each sub-field has a sub-field value. In the above example, the sub-parser is used on the inner envelope of the log records. For example, a number of sub-fields like attributes, ECID, Error ID, level, machine name, message, etc. have respective sub-field values such as [severity-value: 64] [rid: 0] [partition-id: 0] [partition-name: DOMAIN] 6f8e36fc-645a-4b5b-99e5-, b30f7b08da6b-00000a44, BEA-320145, 64, soaappstg-aaa.domain.com, and Size based data retirement operation completed on Unarchive Retired 9,720 records in 11,242 ms as shown in FIG. 7B.

For the SubParser Test, the parser and the parser description are displayed on the user interface 1100 as shown in FIG. 11C. The base fields are "Action", "Type", "Log Group" etc. with respective base field values "action", "FA Unified Apps Logs", and "Sub-parser Testing".

At block 1230, the sub-fields of the one or more sub-parsers are merged to the base fields of the base parsers to generate an output. The output includes the extracted message in the sub-field value of the sub-field message with other sub-fields, base fields and the respective field values as shown in FIG. 7B.

At block 1235, the output is presented to the user on the user interface as shown in FIG. 7B. The fields are clearly displayed on the user interface 1100 that can be easily extracted in the log analytics system 101 and further analysis on the extracted fields and the sub-fields can be performed in the log processing pipeline 107.

Figure 13:
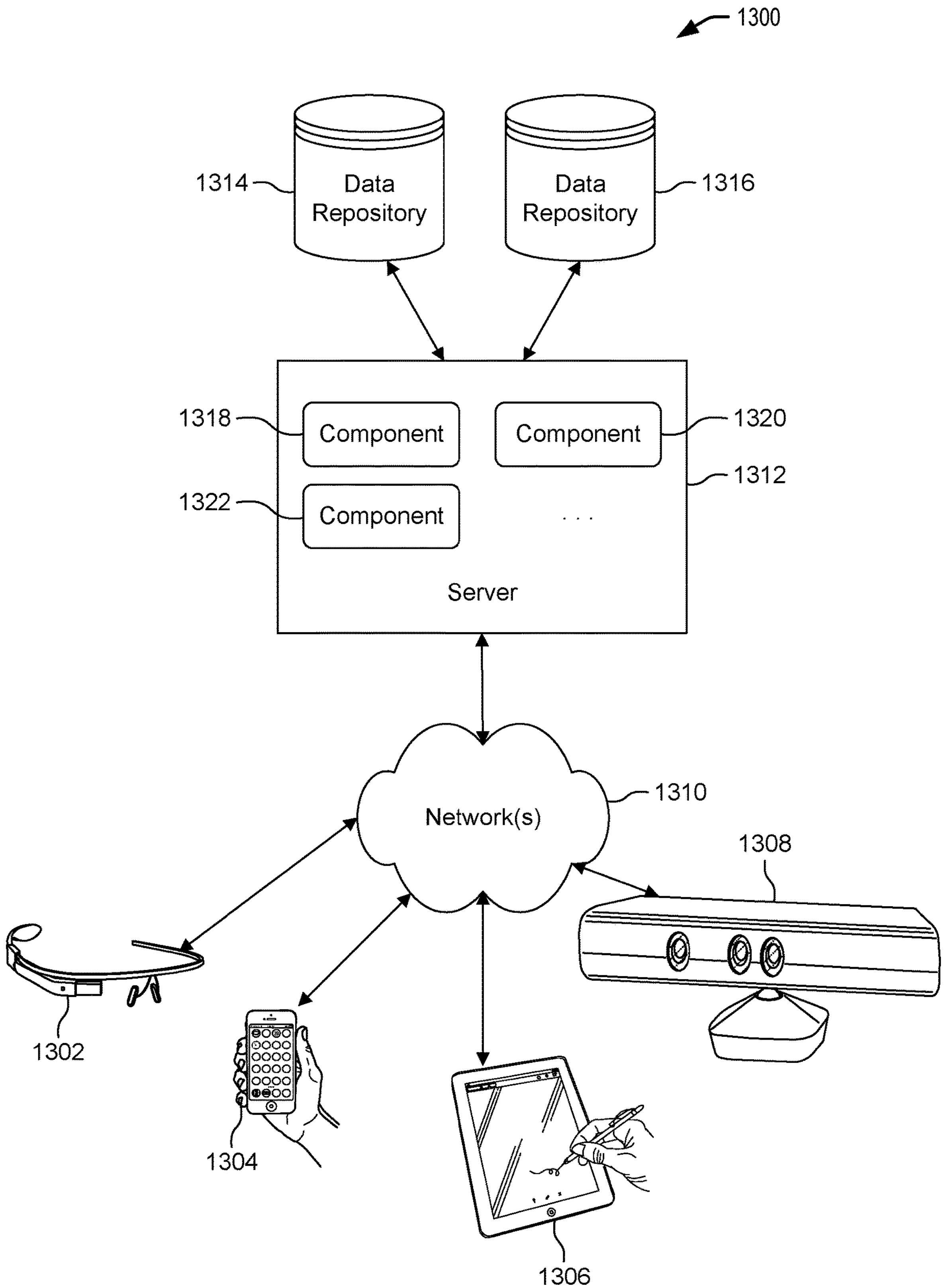
FIG. 13 depicts a simplified diagram of a distributed system for implementing certain aspects.

FIG. 13 depicts a simplified diagram of a distributed system 1300 for implementing an embodiment. In the illustrated embodiment, distributed system 1300 includes one or more client computing devices 1302, 1304, 1306, and 1308, coupled to a server 1312 via one or more communication networks 1310. Clients computing devices 1302, 1304, 1306, and 1308 may be configured to execute one or more applications.

In various aspects, server 1312 may be adapted to run one or more services or software applications that enable techniques for handling long text for pre-trained language models.

In certain aspects, server 1312 may also provide other services or software applications that can include non-virtual and virtual environments. In some aspects, these services may be offered as web-based or cloud services, such as under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 13, server 1312 may include one or more components 1318, 1320 and 1322 that implement the functions performed by server 1312. These components may include software components that may be executed by one or more processors, hardware components, or combinations thereof. It should be appreciated that various different system configurations are possible, which may be different from distributed system 1300. The embodiment shown in FIG. 13 is thus one example of a distributed system for implementing an embodiment system and is not intended to be limiting.

Users may use client computing devices 1302, 1304, 1306, and/or 1308 for techniques for handling long text for pre-trained language models in accordance with the teachings of this disclosure. A client device may provide an interface that enables a user of the client device to interact with the client device. The client device may also output information to the user via this interface. Although FIG. 13 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1310 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1310 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization such as one or more flexible pools of logical storage devices that can be virtualized to maintain virtual storage devices for the server. In various aspects, server 1312 may be adapted to run one or more services or software applications that provide the functionality described in the foregoing disclosure.

The computing systems in server 1312 may run one or more operating systems including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more data repositories 1314, 1316. These data repositories may be used to store data and other information in certain aspects. For example, one or more of the data repositories 1314, 1316 may be used to store information for techniques for handling long text for pre-trained language models (e.g., intent score, overall score). Data repositories 1314, 1316 may reside in a variety of locations. For example, a data repository used by server 1312 may be local to server 1312 or may be remote from server 1312 and in communication with server 1312 via a network-based or dedicated connection. Data repositories 1314, 1316 may be of different types. In certain aspects, a data repository used by server 1312 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1314, 1316 may also be used by applications to store application data. The data repositories used by applications may be of different types such as, for example, a key-value store repository, an object store repository, or a general storage repository supported by a file system.

Figure 14:
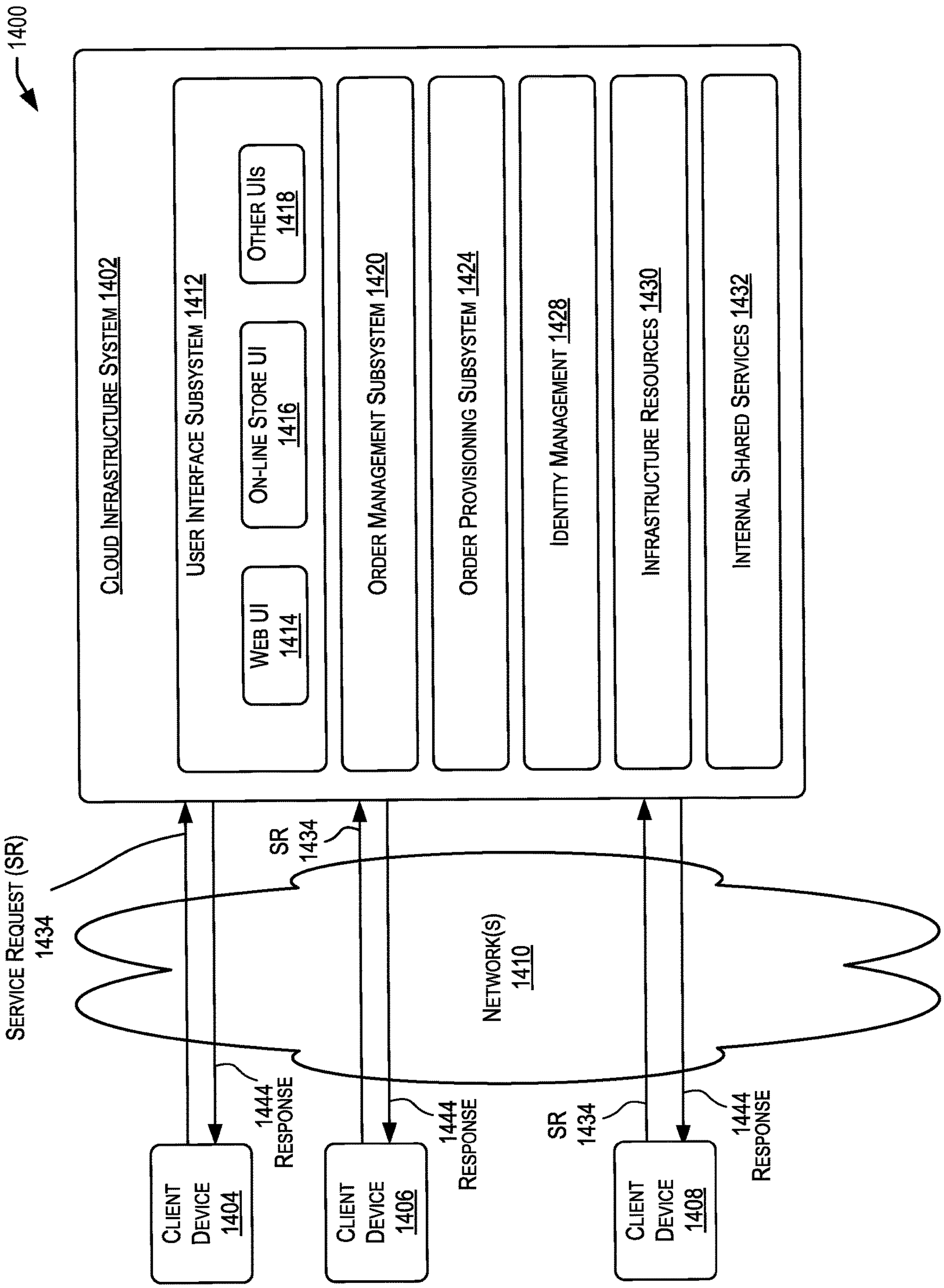
FIG. 14 is a simplified block diagram of one or more components of a system environment by which services provided by one or more components of an embodiment system may be offered as cloud services, in accordance with certain aspects.

In certain aspects, the techniques for handling long text for pre-trained language models functionalities described in this disclosure may be offered as services via a cloud environment. FIG. 14 is a simplified block diagram of a cloud-based system environment in which various text handling-related services may be offered as cloud services, in accordance with certain aspects. In the embodiment depicted in FIG. 14, cloud infrastructure system 1402 may provide one or more cloud services that may be requested by users using one or more client computing devices 1404, 1406, and 1408. Cloud infrastructure system 1402 may comprise one or more computers and/or servers that may include those described above for server 1312. The computers in cloud infrastructure system 1402 may be organized as general purpose computers, specialized server computers, server farms, server clusters, or any other appropriate arrangement and/or combination.

Network(s) 1410 may facilitate communication and exchange of data between clients 1404, 1406, and 1408 and cloud infrastructure system 1402. Network(s) 1410 may include one or more networks. The networks may be of the same or different types. Network(s) 1410 may support one or more communication protocols, including wired and/or wireless protocols, for facilitating the communications.

The embodiment depicted in FIG. 14 is only one example of a cloud infrastructure system and is not intended to be limiting. It should be appreciated that, in some other aspects, cloud infrastructure system 1402 may have more or fewer components than those depicted in FIG. 14, may combine two or more components, or may have a different configuration or arrangement of components. For example, although FIG. 14 depicts three client computing devices, any number of client computing devices may be supported in alternative aspects.

The term cloud service is generally used to refer to a service that is made available to users on demand and via a communication network such as the Internet by systems (e.g., cloud infrastructure system 1402) of a service provider. Typically, in a public cloud environment, servers and systems that make up the cloud service provider's system are different from the client's own on premise servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network 1410 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 1402 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1402 may include a suite of applications, middleware, databases, and other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by cloud infrastructure system 1402. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by cloud infrastructure system 1402. Cloud infrastructure system 1402 then performs processing to provide the services requested in the client's subscription order. Cloud infrastructure system 1402 may be configured to provide one or even multiple cloud services.

Cloud infrastructure system 1402 may provide the cloud services via different deployment models. In a public cloud model, cloud infrastructure system 1402 may be owned by a third party cloud services provider and the cloud services are offered to any general public client, where the client can be an individual or an enterprise. In certain other aspects, under a private cloud model, cloud infrastructure system 1402 may be operated within an organization (e.g., within an enterprise organization) and services provided to clients that are within the organization. For example, the clients may be various departments of an enterprise such as the Human Resources department, the Payroll department, etc. or even individuals within the enterprise. In certain other aspects, under a community cloud model, the cloud infrastructure system 1402 and the services provided may be shared by several organizations in a related community. Various other models such as hybrids of the above mentioned models may also be used.

Client computing devices 1404, 1406, and 1408 may be of different types (such as devices 1302, 1304, 1306, and 1308 depicted in FIG. 13) and may be capable of operating one or more client applications. A user may use a client device to interact with cloud infrastructure system 1402, such as to request a service provided by cloud infrastructure system 1402. For example, a user may use a client device to request a chat bot service described in this disclosure.

In some aspects, the processing performed by cloud infrastructure system 1402 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1402 for determining the intent of an utterance. The data used for this analysis may include structured data (e.g., data stored in a database or structured according to a structured model) and/or unstructured data (e.g., data blobs (binary large objects)).

As depicted in the embodiment in FIG. 14, cloud infrastructure system 1402 may include infrastructure resources 1430 that are utilized for facilitating the provision of various cloud services offered by cloud infrastructure system 1402. Infrastructure resources 1430 may include, for example, processing resources, storage or memory resources, networking resources, and the like.

In certain aspects, to facilitate efficient provisioning of these resources for supporting the various cloud services provided by cloud infrastructure system 1402 for different clients, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1402 may itself internally use services 1432 that are shared by different components of cloud infrastructure system 1402 and which facilitate the provisioning of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1402 may comprise multiple subsystems. These subsystems may be implemented in software, or hardware, or combinations thereof. As depicted in FIG. 14, the subsystems may include a user interface subsystem 1412 that enables users or clients of cloud infrastructure system 1402 to interact with cloud infrastructure system 1402. User interface subsystem 1412 may include various different interfaces such as a web interface 1414, an online store interface 1416 where cloud services provided by cloud infrastructure system 1402 are advertised and are purchasable by a consumer, and other interfaces 1418. For example, a client may, using a client device, request (service request 1434) one or more services provided by cloud infrastructure system 1402 using one or more of interfaces 1414, 1416, and 1418. For example, a client may access the online store, browse cloud services offered by cloud infrastructure system 1402, and place a subscription order for one or more services offered by cloud infrastructure system 1402 that the client wishes to subscribe to. The service request may include information identifying the client and one or more services that the client desires to subscribe to. For example, a client may place a subscription order for a Chabot related service offered by cloud infrastructure system 1402. As part of the order, the client may provide information identifying for input (e.g., utterances).

In certain aspects, such as the embodiment depicted in FIG. 14, cloud infrastructure system 1402 may comprise an order management subsystem (OMS) 1420 that is configured to process the new order. As part of this processing, OMS 1420 may be configured to: create an account for the client, if not done already; receive billing and/or accounting information from the client that is to be used for billing the client for providing the requested service to the client; verify the client information; upon verification, book the order for the client; and orchestrate various workflows to prepare the order for provisioning.

Once properly validated, OMS 1420 may then invoke the order provisioning subsystem (OPS) 1424 that is configured to provision resources for the order including processing, memory, and networking resources. The provisioning may include allocating resources for the order and configuring the resources to facilitate the service requested by the client order. The manner in which resources are provisioned for an order and the type of the provisioned resources may depend upon the type of cloud service that has been ordered by the client. For example, according to one workflow, OPS 1424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting client for providing the requested service.

Cloud infrastructure system 1402 may send a response or notification 1444 to the requesting client to indicate when the requested service is now ready for use. In some instances, information (e.g., a link) may be sent to the client that enables the client to start using and availing the benefits of the requested services.

Cloud infrastructure system 1402 may provide services to multiple clients. For each client, cloud infrastructure system 1402 is responsible for managing information related to one or more subscription orders received from the client, maintaining client data related to the orders, and providing the requested services to the client. Cloud infrastructure system 1402 may also collect usage statistics regarding a client's use of subscribed services. For example, statistics may be collected for the amount of storage used, the amount of data transferred, the number of users, and the amount of system up time and system down time, and the like. This usage information may be used to bill the client. Billing may be done, for example, on a monthly cycle.

Cloud infrastructure system 1402 may provide services to multiple clients in parallel. Cloud infrastructure system 1402 may store information for these clients, including possibly proprietary information. In certain aspects, cloud infrastructure system 1402 comprises an identity management subsystem (IMS) 1428 that is configured to manage client's information and provide the separation of the managed information such that information related to one client is not accessible by another client. IMS 1428 may be configured to provide various security-related services such as identity services, such as information access management, authentication and authorization services, services for managing client identities and roles and related capabilities, and the like.

Figure 15:
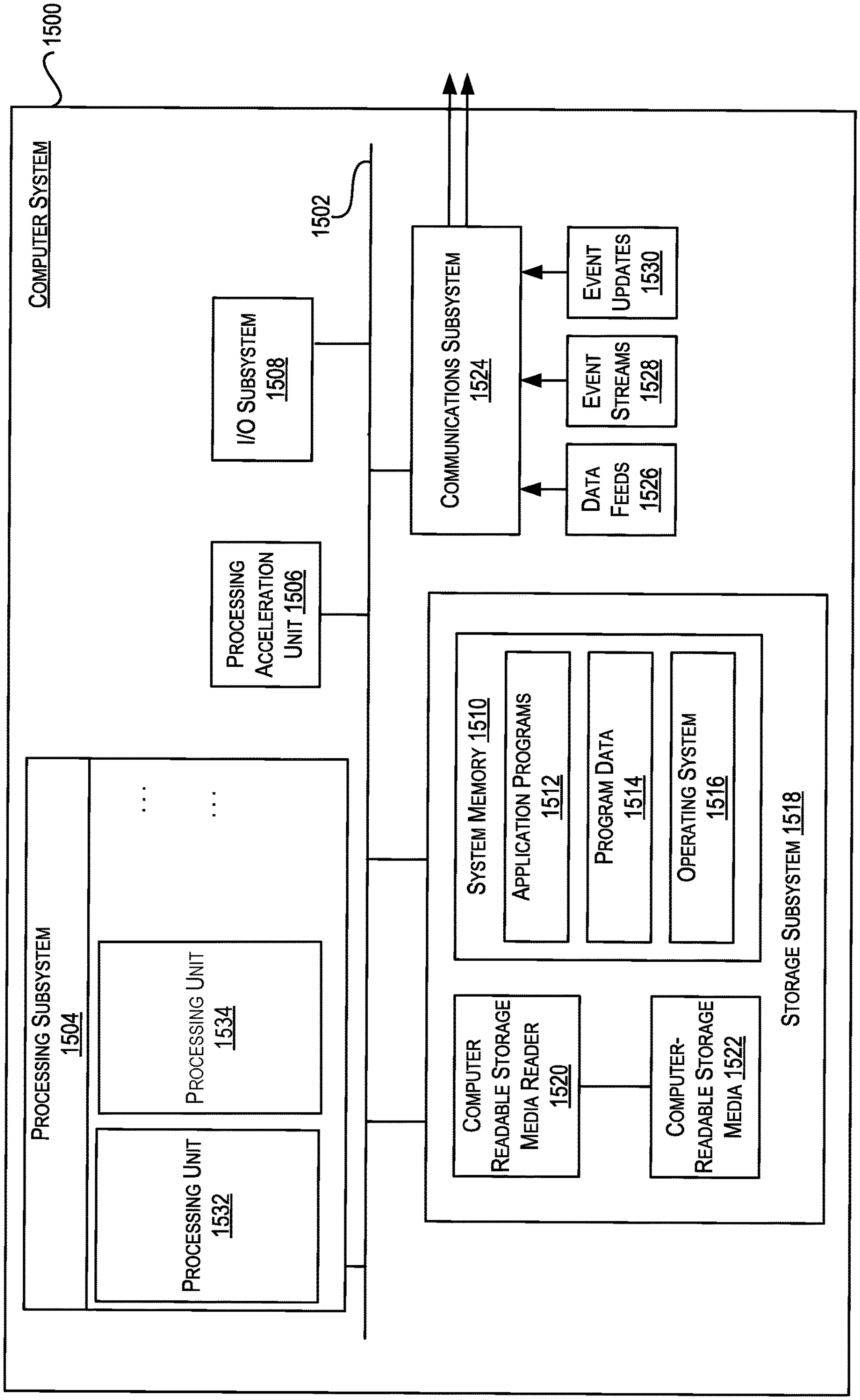
FIG. 15 illustrates an example computer system that may be used to implement certain aspects.

FIG. 15 illustrates an exemplary computer system 1500 that may be used to implement certain aspects. For example, in some aspects, computer system 1500 may be used to implement any of the system 100 for enriching log records with fields from other log records in structured format as shown in FIG. 1 and various servers and computer systems described above. As shown in FIG. 15, computer system 1500 includes various subsystems including a processing subsystem 1504 that communicates with a number of other subsystems via a bus subsystem 1502. These other subsystems may include a processing acceleration unit 1506, an I/O subsystem 1508, a storage subsystem 1518, and a communications subsystem 1524. Storage subsystem 1518 may include non-transitory computer-readable storage media including storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative aspects of the bus subsystem may utilize multiple buses. Bus subsystem 1502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processors, application specific integrated circuits (ASICs), or field programmable gate arrays (FPGAs). The processors may include be single core or multicore processors. The processing resources of computer system 1500 can be organized into one or more processing units 1532, 1534, etc. A processing unit may include one or more processors, one or more cores from the same or different processors, a combination of cores and processors, or other combinations of cores and processors. In some aspects, processing subsystem 1504 can include one or more special purpose co-processors such as graphics processors, digital signal processors (DSPs), or the like. In some aspects, some or all of the processing units of processing subsystem 1504 can be implemented using customized circuits, such as application specific integrated circuits (ASICs), or field programmable gate arrays (FPGAs).

In some aspects, the processing units in processing subsystem 1504 can execute instructions stored in system memory 1510 or on computer readable storage media 1522. In various aspects, the processing units can execute a variety of programs or code instructions and can maintain multiple concurrently executing programs or processes. At any given time, some or all of the program code to be executed can be resident in system memory 1510 and/or on computer-readable storage media 1522 including potentially on one or more storage devices. Through suitable programming, processing subsystem 1504 can provide various functionalities described above. In instances where computer system 1500 is executing one or more virtual machines, one or more processing units may be allocated to each virtual machine.

In certain aspects, a processing acceleration unit 1506 may optionally be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term input device is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1500 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1518 provides a repository or data store for storing information and data that is used by computer system 1500. Storage subsystem 1518 provides a tangible non-transitory computer-readable storage medium for storing the basic programming and data constructs that provide the functionality of some aspects. Storage subsystem 1518 may store software (e.g., programs, code modules, instructions) that when executed by processing subsystem 1504 provides the functionality described above. The software may be executed by one or more processing units of processing subsystem 1504. Storage subsystem 1518 may also provide a repository for storing data used in accordance with the teachings of this disclosure.

Storage subsystem 1518 may include one or more non-transitory memory devices, including volatile and non-volatile memory devices. As shown in FIG. 15, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM), dynamic random access memory (DRAM), and the like.

By way of example, and not limitation, as depicted in FIG. 15, system memory 1510 may load application programs 1512 that are being executed, which may include various applications such as Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1522 may store programming and data constructs that provide the functionality of some aspects. Computer-readable media 1522 may provide storage of computer-readable instructions, data structures, program modules, and other data for computer system 1500. Software (programs, code modules, instructions) that, when executed by processing subsystem 1504 provides the functionality described above, may be stored in storage subsystem 1518. By way of example, computer-readable storage media 1522 may include non-volatile memory such as a hard disk drive, a magnetic disk drive, an optical disk drive such as a CD ROM, digital video disc (DVD), a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1518 may also include a computer-readable storage media reader 1520 that can further be connected to computer-readable storage media 1522. Reader 1520 may receive and be configured to read data from a memory device such as a disk, a flash drive, etc.

In certain aspects, computer system 1500 may support virtualization technologies, including but not limited to virtualization of processing and memory resources. For example, computer system 1500 may provide support for executing one or more virtual machines. In certain aspects, computer system 1500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1500. Accordingly, multiple operating systems may potentially be run concurrently by computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices. For example, the communication subsystem may be used to transmit a response to a user regarding the inquiry for a Chabot.

Communication subsystem 1524 may support both wired and/or wireless communication protocols. For example, in certain aspects, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802. XX family standards, or other mobile communication technologies, or any combination thereof), global positioning system (GPS) receiver components, and/or other components. In some aspects communications subsystem 1524 can provide wired network connectivity (e.g., Ethernet) in addition to or instead of a wireless interface.

Communication subsystem 1524 can receive and transmit data in various forms. For example, in some aspects, in addition to other forms, communications subsystem 1524 may receive input communications in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to communicate data from computer system 1500 to other computer systems or networks. The data may be communicated in various different forms such as structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1500 depicted in FIG. 15 is intended only as a specific example. Many other configurations having more or fewer components than the system depicted in FIG. 15 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a plurality of log records, wherein each of the plurality of log records is associated with a log source, and wherein each log record comprises an outer envelope including an inner payload;

identifying a base parser of a plurality of base parsers for parsing a log record of the plurality of log records based on a type of the log record, wherein the type of the log record is indicated in the log source;

generating a base-parsed log record by parsing, by the base parser, the outer envelope of the log record to extract base field values corresponding to a plurality of base fields of the log record;

identifying a plurality of sub-parsers using field mappings associated with the base parser, wherein the field mappings associate one or more base field values with corresponding sub-parsers;

iterating over the field mappings associated with the extracted base field values to determine, based on the extracted base field values, one or more selected sub-parsers to be activated;

loading the one or more selected sub-parsers in response to determining the one or more selected sub-parsers from the field mappings;

parsing, by the one or more selected sub-parsers, the inner payload as a value of at least one of the base fields of the base-parsed log record to extract sub-fields, wherein each sub-field has a corresponding sub-field value;

merging the sub-fields to the plurality of base fields to generate an output; and presenting the output that includes the log record with the plurality of base fields and corresponding base field values and the sub-fields with corresponding sub-field values.

2. The method of claim 1, wherein:

the output is displayed on a user interface (UI), the log source defines log file locations of the plurality of log records, the plurality of base parsers is configured in the log source, and the field mappings associating base field values with sub-parsers are user configurable.

3. The method of claim 1, wherein the plurality of log records is wrapped in regular expressions (regex), JavaScript Object Notation (JSON), Extensible Markup Language (XML), plain text, or delimited type outer envelope.

4. The method of claim 1, further comprising:

acquiring log source metadata associated with the log source, wherein the log source metadata includes a name and version of data of the log source;

acquiring log source information using the log source metadata, wherein the log source information includes one or more base parser references of the plurality of base parsers;

acquiring the plurality of base parsers using the one or more base parser references;

acquiring base parser information of the plurality of base parsers, the base parser information includes the field mappings for each base parser of the log source;

acquiring the plurality of sub-parsers of each of the plurality of base parsers by iterating each base parser reference of the one or more base parser references to identify sub-parsers corresponding to the plurality of base parsers;

acquiring sub-parser information corresponding to the plurality of sub-parsers, wherein the sub-parser information is a sub-parser name;

loading the plurality of sub-parsers using the sub-parser information; and generating a configuration data object with details of the log source, the plurality of base parsers and the plurality of sub-parsers; and processing the plurality of log records with the configuration data object at a log processing time.

5. The method of claim 1, wherein the plurality of log records is parsed using configured regular expressions (regex), JavaScript Object Notation (JSON), Extensible Markup Language (XML), plain text, or delimited type parser.

6. The method of claim 1, wherein:

a value of at least one of the plurality of base fields comprises log record content provided as input to a selected sub-parser of the one or more selected sub-parsers; and a predefined limit is applied to a number of selected sub-parsers activated for parsing the inner payload.

7. The method of claim 1, wherein a sub-field obtained from a sub-parser has a higher relevancy than a field obtained from a base parser.

8. A system comprising:

one or more processors; and a memory coupled to the one or more processors, the memory storing a plurality of instructions executable by the one or more processors, the plurality of instructions that when executed by the one or more processors cause the one or more processors to perform a set of operations comprising:

accessing a plurality of log records, wherein each of the plurality of log records is associated with a log source, and wherein each log record comprises an outer envelope including an inner payload;

identifying a base parser of a plurality of base parsers for parsing a log record of the plurality of log records based on a type of the log record, wherein the type of the log record is indicated in the log source;

generating a base-parsed log record by parsing, by the base parser, the outer envelope of the log record to extract base field values corresponding to a plurality of base fields of the log record;

identifying a plurality of sub-parsers using field mappings associated with the base parser, wherein the field mappings associate one or more base field values with corresponding sub-parsers;

iterating over the field mappings associated with the extracted base field values to determine, based on the extracted base field values, one or more selected sub-parsers to be activated;

loading the one or more selected sub-parsers in response to determining the one or more selected sub-parsers from the field mappings;

parsing, by the one or more selected sub-parsers, the inner payload as a value of at least one of the base fields of the base-parsed log record to extract sub-fields, wherein each sub-field has a corresponding sub-field value;

merging the sub-fields to the plurality of base fields to generate an output; and presenting the output that includes the log record with the plurality of base fields and corresponding base field values and the sub-fields with corresponding sub-field values.

9. The system of claim 8, wherein the log source defines log file locations of the plurality of log records, the plurality of base parsers is configured in the log source, and the field mappings are user configurable.

10. The system of claim 8, wherein the plurality of log records is wrapped in regular expressions (regex), JavaScript Object Notation (JSON), Extensible Markup Language (XML), plain text, or delimited type outer envelope, and the output is displayed on a user interface (UI).

11. The system of claim 8, further comprising:

acquiring log source metadata associated with the log source, wherein the log source metadata includes a name and version of data of the log source;

acquiring log source information using the log source metadata, wherein the log source information includes one or more base parser references of the plurality of base parsers;

acquiring the plurality of base parsers using the one or more base parser references;

acquiring base parser information of the plurality of base parsers, the base parser information includes the field mappings for each base parser of the log source;

acquiring the plurality of sub-parsers of each of the plurality of base parsers by iterating each base parser reference of the one or more base parser references to identify sub-parsers corresponding to the plurality of base parsers;

acquiring sub-parser information corresponding to the plurality of sub-parsers, wherein the sub-parser information is a sub-parser name;

loading the plurality of sub-parsers using the sub-parser information; and generating a configuration data object with details of the log source, the plurality of base parsers and the plurality of sub-parsers; and processing the plurality of log records with the configuration data object at a log processing time.

12. The system of claim 8, wherein:

the plurality of log records is parsed using configured regular expressions (regex), JavaScript Object Notation (JSON), Extensible Markup Language (XML), plain text, or delimited type parser.

13. The system of claim 8, wherein;

a value of at least one of the plurality of base fields comprises log record content provided as input to a selected sub-parser of the one or more selected sub-parsers; and a predefined limit is applied to a number of selected sub-parsers activated for parsing the inner payload.

14. The system of claim 8, wherein a sub-field obtained from a sub-parser has a higher relevancy than a field obtained from a base parser.

15. A non-transitory computer-readable medium storing a plurality of instructions executable by one or more processors that cause the one or more processors to perform operations comprising:

accessing a plurality of log records, wherein each of the plurality of log records is associated with a log source, and wherein each log record comprises an outer envelope including an inner payload;

identifying a base parser of a plurality of base parsers for parsing a log record of the plurality of log records based on a type of the log record, wherein the type of the log record is indicated in the log source;

generating a base-parsed log record by parsing, by the base parser, the outer envelope of the log record to extract base field values corresponding to a plurality of base fields of the log record;

identifying a plurality of sub-parsers using field mappings associated with the base parser, wherein the field mappings associate one or more base field values with corresponding sub-parsers;

iterating over the field mappings associated with the extracted base field values to determine, based on the extracted base field values, one or more selected sub-parsers to be activated;

loading the one or more selected sub-parsers in response to determining the one or more selected sub-parsers from the field mappings;

parsing, by the one or more selected sub-parsers, the inner payload as a value of at least one of the base fields of the base-parsed log record to extract sub-fields, wherein each sub-field has a corresponding sub-field value;

merging the sub-fields to the plurality of base fields to generate an output; and presenting the output that includes the log record with the plurality of base fields and corresponding base field values and the sub-fields with corresponding sub-field values.

16. The non-transitory computer-readable medium of claim 15, wherein the log source defines log file locations of the plurality of log records, the plurality of base parsers is configured in the log source, and the field mappings are user configurable.

17. The non-transitory computer-readable medium of claim 15, wherein the output is displayed on a user interface (UI).

18. The non-transitory computer-readable medium of claim 15, wherein;

a value of at least one of the plurality of base fields comprises log record content provided as input to a selected sub-parser of the one or more selected sub-parsers; and a predefined limit is applied to a number of selected sub-parsers activated for parsing the inner payload.

19. The non-transitory computer-readable medium of claim 15, wherein the plurality of log records is parsed using configured regular expressions (regex), JavaScript Object Notation (JSON), Extensible Markup Language (XML), plain text, or delimited type parser.

20. The non-transitory computer-readable medium of claim 15, wherein the plurality of log records is wrapped in regular expressions (regex), JavaScript Object Notation (JSON), Extensible Markup Language (XML), plain text, or delimited type outer envelope.

* * * * *